(12) United States Patent  
Sawabe et al.

(10) Patent No.: US 12,326,556 B1
(45) Date of Patent: Jun. 10, 2025

(54) IMAGE READING DEVICE

(71) Applicant: Mitsubishi Electric Corporation, Tokyo (JP)

(72) Inventors: Toshiyuki Sawabe, Tokyo (JP); Kazuki Nishimura, Tokyo (JP); Koki Takasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/878,078

(22) PCT Filed: Nov. 1, 2023

(86) PCT No.: PCT/JP2023/039420
§ 371 (c)(1),
(2) Date: Dec. 23, 2024

(87) PCT Pub. No.: WO2024/116706
PCT Pub. Date: Jun. 6, 2024

(30) Foreign Application Priority Data

Nov. 29, 2022 (JP) ................................. 2022-190328

(51) Int. Cl.
H04N 1/04 (2006.01)
G02B 3/00 (2006.01)
(Continued)

(52) U.S. Cl.
CPC ....... *G02B 27/0081* (2013.01); *G02B 3/0037* (2013.01); *G02B 5/005* (2013.01);
(Continued)

(58) Field of Classification Search
USPC ................................ 358/475, 482, 483, 474
See application file for complete search history.

(56) References Cited

U.S. PATENT DOCUMENTS 5,570,204 A 10/1996 Kumashiro
2005/0161583 A1* 7/2005 Matsumoto .......... G02B 3/0037
250/208.1
(Continued)

FOREIGN PATENT DOCUMENTS

JP H07-203125 A 8/1995
JP 2013-168925 A 8/2013
(Continued)

OTHER PUBLICATIONS

International Search Report and Written Opinion mailed on Jan. 16, 2024, received for PCT Application PCT/JP2023/039420, filed on Nov. 1, 2023, 8 pages including English Translation.
(Continued)

*Primary Examiner* — Cheukfan Lee
(74) *Attorney, Agent, or Firm* — XSENSUS LLP

(57) ABSTRACT

Lens arrays of an image reading device in which lens bodies are arranged in a main scanning direction are connected with a gap therebetween. A plurality of first slit portions and a plurality of second slit portions are provided along the main scanning direction between the lens arrays and an image sensor. The first slit portion includes first light shielding plates that separate optical paths of light passed through the lens bodies. The second slit portion includes the first light shielding plates and a second light shielding plate that restricts an optical path of light passed through a lens body closest to the gap at a gap side. The position of the second light shielding plate in a direction along the optical path at the image sensor side is closer to the lens arrays than the first light shielding plates are.

20 Claims, 17 Drawing Sheets

(51) Int. Cl.
*G02B 5/00* (2006.01)
*G02B 27/00* (2006.01)
*H04N 1/028* (2006.01)
*H04N 1/03* (2006.01)

(52) U.S. Cl.
CPC ......... *H04N 1/0289* (2013.01); *H04N 1/0306* (2013.01); *H04N 2201/0081* (2013.01)

(56) References Cited

U.S. PATENT DOCUMENTS

| | | | | |
|---|---|---|---|---|
| 2011/0007368 | A1* | 1/2011 | Saito | H04N 1/0312 |
| | | | | 358/475 |
| 2011/0038019 | A1* | 2/2011 | Kawano | H04N 1/19589 |
| | | | | 358/475 |
| 2011/0242264 | A1* | 10/2011 | Kubota | G03G 15/04054 |
| | | | | 347/258 |
| 2013/0181311 | A1 | 7/2013 | Sugiyama | |
| 2022/0043232 | A1 | 2/2022 | Sawabe et al. | |
| 2023/0108017 | A1* | 4/2023 | Sawabe | H04N 1/0289 |
| | | | | 358/475 |

FOREIGN PATENT DOCUMENTS

| | | |
|---|---|---|
| JP | 6752391 B1 | 9/2020 |
| WO | 2020/090136 A1 | 5/2020 |
| WO | 2021/193945 A1 | 9/2021 |

OTHER PUBLICATIONS

Decision to Grant a Patent mailed on Jun. 18, 2024, received for Japanese Application 2024-522460, 5 pages including English Translation.

* cited by examiner 101, 102, 103

101, 102, 103

IMAGE READING DEVICE

CROSS-REFERENCE TO RELATED APPLICATIONS

This application is a national stage application, pursuant to 35 U.S.C. § 371, of International Patent Application No. PCT/JP2023/039420, filed Nov. 1, 2023, which claims the benefit of Japanese Patent Application No. 2022-190328, filed on Nov. 29, 2022, the entire disclosure of each are incorporated herein by reference.

TECHNICAL FIELD

The present disclosure relates to an image reading device.

BACKGROUND ART

Known image reading devices converge light transmitted through or reflected by a reading target (illumination target) with a lens array including an array of lens bodies, and read an image converged by the lens array with an image sensor to acquire electronic information representing a two-dimensional image, for example, images, characters, and patterns on the reading target.

In such an image reading device, in a case where the length of the reading target in a main scanning direction is longer than the limit length for manufacturing one lens array, a plurality of lens arrays must be arranged and joined in the main scanning direction. There is a joining method to arrange the plurality of lens arrays in the main scanning direction with a gap between adjacent lens arrays (for example, Patent Literature 1).

Further, in the image reading device, light converged by adjacent lens bodies overlap to form an image on an image sensor. The images of light converged by the adjacent lens bodies form an image on the image sensor with positional displacement due to differences in optical characteristics or assembly errors of lens bodies, a shift in the distance between the reading target and the focal point of the lens body on the reading target side, or the like. Therefore, the allowable range of the position of the reading target relative to the focal point of the lens body when it can be determined to be in focus is smaller. In other words, the depth of field of the image reading device is caused to be shallowed. Then, an example of a slit portion with a light shielding plate that separates an optical path of light passed through one lens body from another optical path of light passed through an adjacent lens body provided between the lens array and the image sensor has been proposed (e.g., Patent Literature 2). This structure can restrict overlaps of optical paths of light passed through adjacent lens bodies to achieve a larger depth of field.

CITATION LIST

Patent Literature

Patent Literature 1: International Publication No. WO 2020/090136
Patent Literature 2: International Publication No. WO 2021/193945

SUMMARY OF INVENTION

Technical Problem

The configuration of Patent Literature 2 provides a slit portion between the lens array and the image sensor to restrict the spreads of optical paths of light passed through the lens bodies and to restrict overlaps of spreads of optical paths of light passed through adjacent lens bodies, in order to achieve a larger depth of field. In a case where a plurality of lens arrays are arranged in the main scanning direction with a gap between adjacent lens arrays, the spreads of optical paths of light passed through two lens bodies adjacent to each other with a gap therebetween do not overlap at a gap portion and the read images discontinue. The spread of optical path of light passed through a lens body is also called a field of view of the lens body.

In view of the above circumstances, an objective of the present disclosure is to provide an image reading device in which read images do not discontinue at a gap portion between lens arrays even in a case where a plurality of lens arrays are arranged in the main scanning direction with a gap between adjacent lens arrays.

Solution to Problem

An image reading device of the present disclosure includes a plurality of lens arrays arranged in a main scanning direction and each including a plurality of lens bodies arranged in the main scanning direction, each two adjacent lens arrays of the plurality of lens arrays being arranged with a gap therebetween, and an image sensor to receive light converged by the plurality of lens bodies. The image reading device further includes a plurality of slit portions arranged between the plurality of lens arrays and the image sensor in the main scanning direction by providing one or more slit portions of the plurality of slit portions for one of the plurality of lens arrays. The plurality of slit portions include a second slit portion that is a slit portion that includes first light shielding plates and a second light shielding plate, the first light shielding plates each separating an optical path of light passed through one lens body of the plurality of lens bodies from another optical path of light passed through an adjacent lens body of the plurality of lens bodies, the second light shielding plate restricting an optical path of light passed through a lens body of the plurality of lens bodies closest to the gap at a gap side in the main scanning direction and of which a position in a direction along the optical path at an image sensor side is closer to the plurality of lens arrays than the first light shielding plates are, so that a field of view of the lens body closest to the gap representing a spread of the restricted optical path overlaps, on a surface of the image sensor facing the plurality of lens arrays, a field of view of an adjacent lens body adjacent, with the gap therebetween, to the lens body closest to the gap of the plurality of lens bodies. The plurality of slit portions also include a first slit portion that is a slit portion that includes only the first light shielding plates in a case where more than one slit portions of the plurality of slit portions are provided for one lens array of the plurality of lens arrays.

Advantageous Effects of Invention

According to the present disclosure, even in a case where a plurality of lens arrays are arranged in a main scanning direction with a gap between adjacent lens arrays, fields of view of lens bodies closest to the gap restricted by a second light shielding plate overlap. As such, the read images do not discontinue at a gap portion between the lens arrays.

DESCRIPTION OF EMBODIMENTS

Embodiment 1

Figure 1:
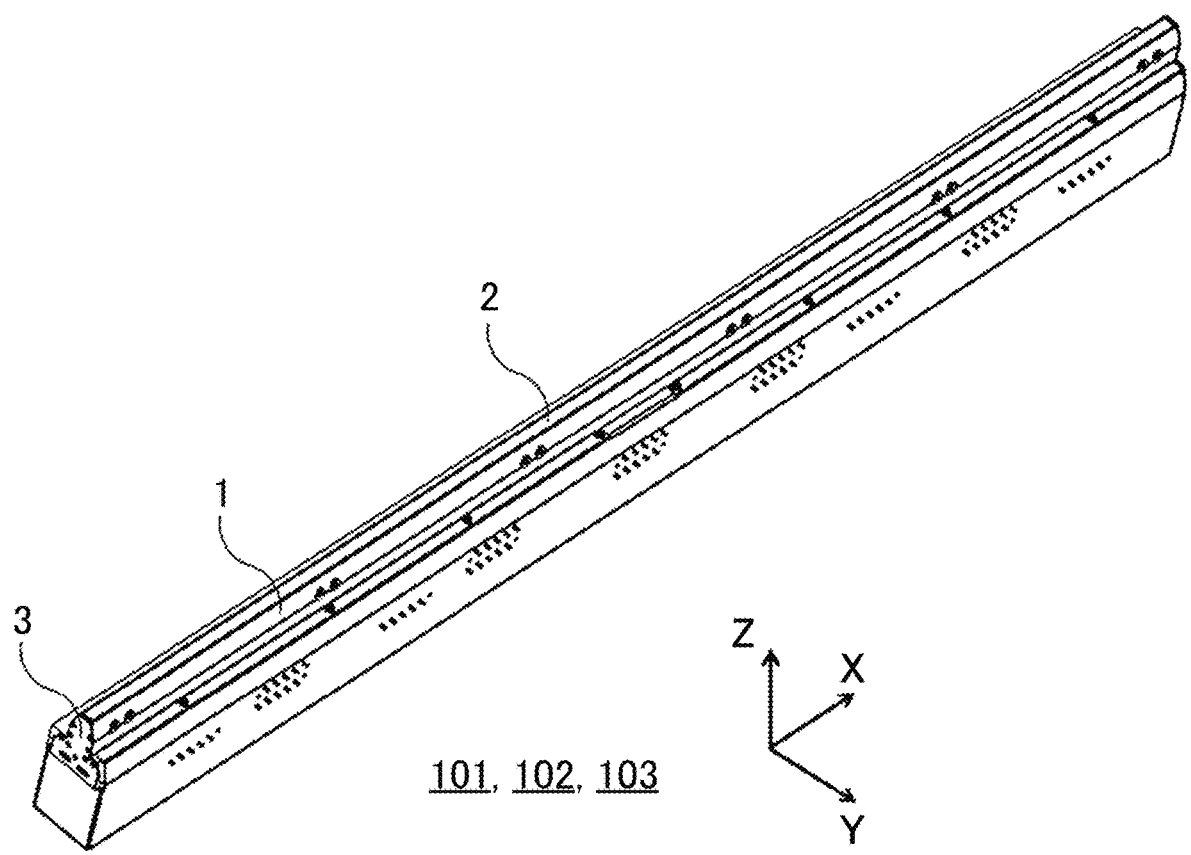
FIG. 1 is a perspective view of an image reading device according to Embodiment 1 of the present disclosure.

An image reading device 101 according to Embodiment 1 is described below using FIGS. 1 to 12. In the drawings, X, Y, and Z indicate coordinate axes. X-axis, Y-axis, and Z-axis are perpendicular to one another. An X-axis direction is referred to as a main scanning direction, a Y-axis direction is referred to as a sub-scanning direction, and a Z-axis direction is referred to as an optical-axis direction. The image reading device 101 includes image sensors. The main scanning direction is a direction in which the image sensors are arranged. The sub-scanning direction is a direction in which a reading target travels relative to the image reading device 101. The optical-axis direction is a direction along an optical path along which light from the reading target travels, and is a direction of a central axis of the lens body through which the light from the reading target is transmitted. In the present disclosure, a case where a reading target is transported over the image reading device 101 is used as an example.

Figure 2:
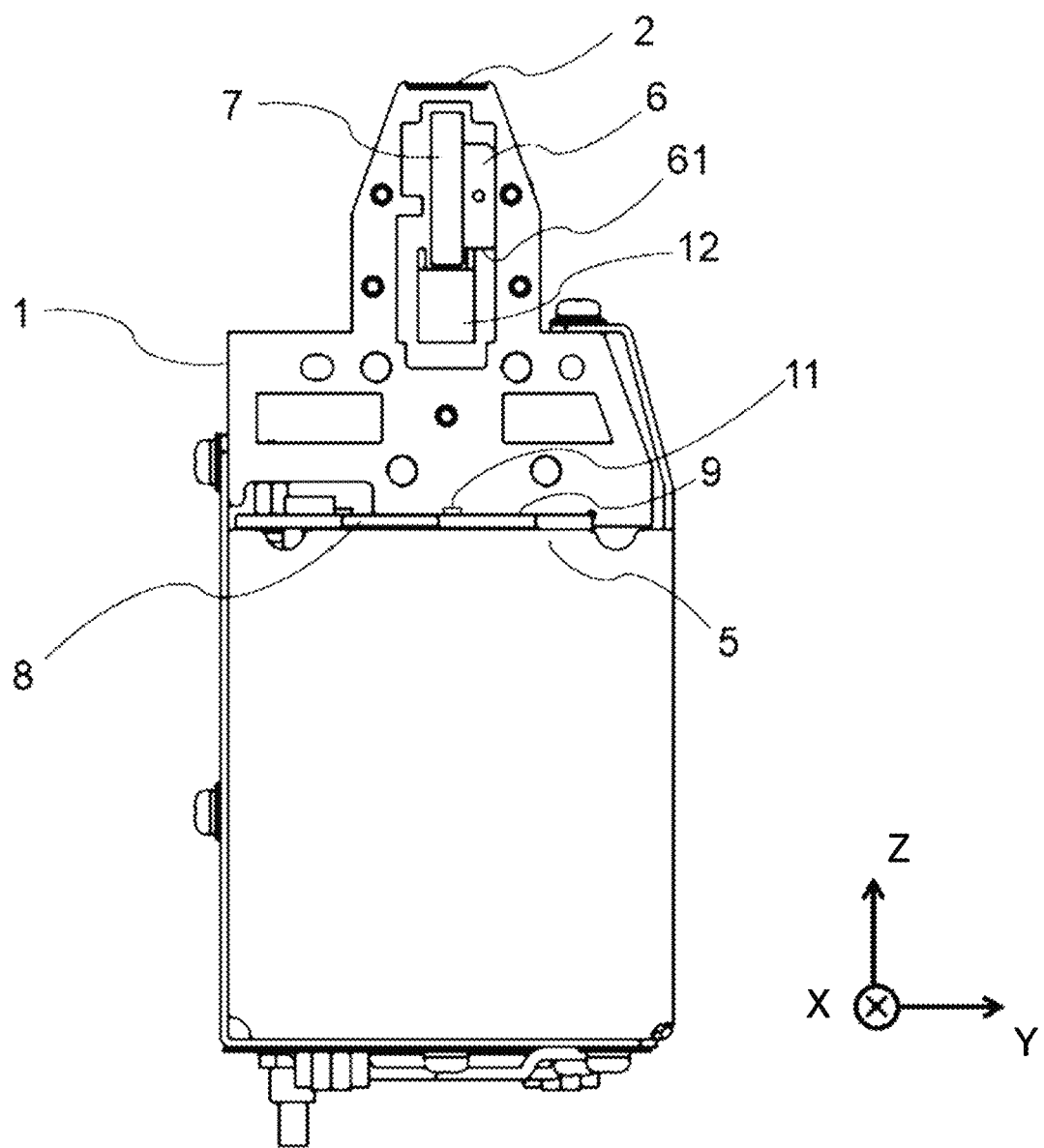
FIG. 2 is a side view of the image reading device according to Embodiment 1 of the present disclosure from which a frame side plate is removed, as viewed in a main scanning direction.

First, an outline of a configuration of the image reading device 101 is described using FIGS. 1 and 2. FIG. 1 is a perspective view of the image reading device 101 according to Embodiment 1 of the present disclosure. FIG. 2 is a side view of the image reading device 101 according to Embodiment 1 of the present disclosure from which a frame side plate 3 is removed, as viewed in the main scanning direction.

As illustrated in FIGS. 1 and 2, the image reading device 101 includes a frame 1, a transparent plate 2, frame side plates 3, a substrate support plate 5, a lens retainer plate 6, a lens array 7, a sensor drive substrate 8, a sensor substrate 9, image sensors 11, and a slit portion 12. The image reading device 101 reads image information of a reading target, which is not illustrated.

Examples of the reading target include banknotes, securities, and other common documents. Examples of the reading target include a medium to be read (illumination target) that carries image information of the reading target to be read.

The frame 1 is frame-shaped with the main scanning direction (X-axis direction) being a longitudinal direction. The frame 1 has a space inside. The space extends in the main scanning direction (X-axis direction). The frame 1 has a rectangular opening on a reading target side (upper surface). The frame 1 has openings at both ends of the frame 1 in the main scanning direction (X-axis direction). The frame 1 has an opening on a side opposite to the reading target side.

The lateral direction of the frame 1 corresponds to the sub-scanning direction (Y-axis direction). The frame 1 is formed of, for example, aluminum, other metals, or resin.

The frame 1 accommodates or holds the lens retainer plate 6, the lens array 7, the sensor drive substrate 8, the sensor substrate 9, the image sensor 11, and the slit portion 12.

The transparent plate 2 is provided on the upper surface of the frame 1 and closes the opening. The transparent plate 2 is formed of, for example, transparent resin or transparent glass. The transparent plate 2 has two flat-plate surfaces extending in the main scanning direction (X-axis direction). The two surfaces are one surface provided on the frame 1 side and another surface provided on a side opposite to the frame 1 side. The surface of the transparent plate 2 provided on the frame 1 side is referred to as an inner surface. The surface of the transparent plate 2 provided on the side opposite to the frame 1 side is referred to as an outer surface.

The outer surface of the transparent plate 2 is a reading surface for reading an image from the reading target. The reading surface restricts the position at which the reading target is read in the optical-axis direction (Z-axis direction).

The frame side plate 3 is, for example, a plate member including a metal plate. The frame side plates 3 close both ends of a space defined in the frame 1 in the main scanning direction (X-axis direction) and defines side surfaces of the frame 1.

The substrate support plate 5 closes a bottom portion of the space defined in the frame 1 on a side opposite to the upper surface on which the transparent plate 2 is provided. The substrate support plate 5 is fixed to the frame 1 with, for example, tape, an adhesive, or a screw. The substrate support plate 5, the frame side plates 3, and the frame 1 are formed of a material that blocks external light.

The frame 1, the transparent plate 2, the frame side plates 3, and the substrate support plate 5 seal a space in which the image sensors 11 exist. Components other than the transparent plate 2 transmit no light. Therefore, the substrate support plate 5, the frame side plates 3, and the frame 1 can block light entering the image sensor 11 from the exterior of the image reading device 101. These components also have an effect of preventing contaminants such as dust from entering the image reading device 101.

The lens arrays 7 are arranged between the reading target and the image sensors 11. The lens arrays are arranged in the main scanning direction (X-axis direction) with gaps therebetween. The lens arrays 7 are adhered to the lens retainer plate 6 with a double-sided tape, an adhesive, or the like. The lens retainer plate 6 to which the lens arrays 7 are bonded is fixed to the frame 1 with a screw. The lens bodies 41 of the lens array 7 have optical axes perpendicular to the reading surface. The lens array 7 converges light emitted from an illuminator (not illustrated), reflected by the reading target or transmitted through the reading target, and then passed through the transparent plate 2, to form an image on the image sensor 11 within the frame 1. The illuminator may be accommodated in the frame 1 or may be provided outside the frame 1.

The image sensors 11 receive light converged by the lens array 7, convert the light into an electrical signal through photoelectric conversion, and then output the electrical signal. The image sensors 11 are arrayed in accordance with the arrangement in the lens bodies 41. The image sensor 11 includes, for example, a light receiver having a semiconductor chip, and a drive circuit. The image sensor 11 is fixed to the sensor substrate 9 with an adhesive.

The sensor substrate 9 is a substrate formed of glass epoxy or other resin. The image sensors 11 are mounted on the sensor substrate 9. Together with the sensor drive substrate 8 having a circuit for driving the image sensor 11, the sensor substrate 9 is fixed to the substrate support plate 5 with, for example, an adhesive, tape, or a screw. The sensor substrate 9 is fixed to a surface of the substrate support plate 5 facing the lens array. The straight line along which the optical axes of the lens bodies 41 included in the lens array 7 exists is aligned with the straight line passing through the center of the light receiver installed in the image sensor 11 and perpendicular to a light-receiving surface.

Figure 3:
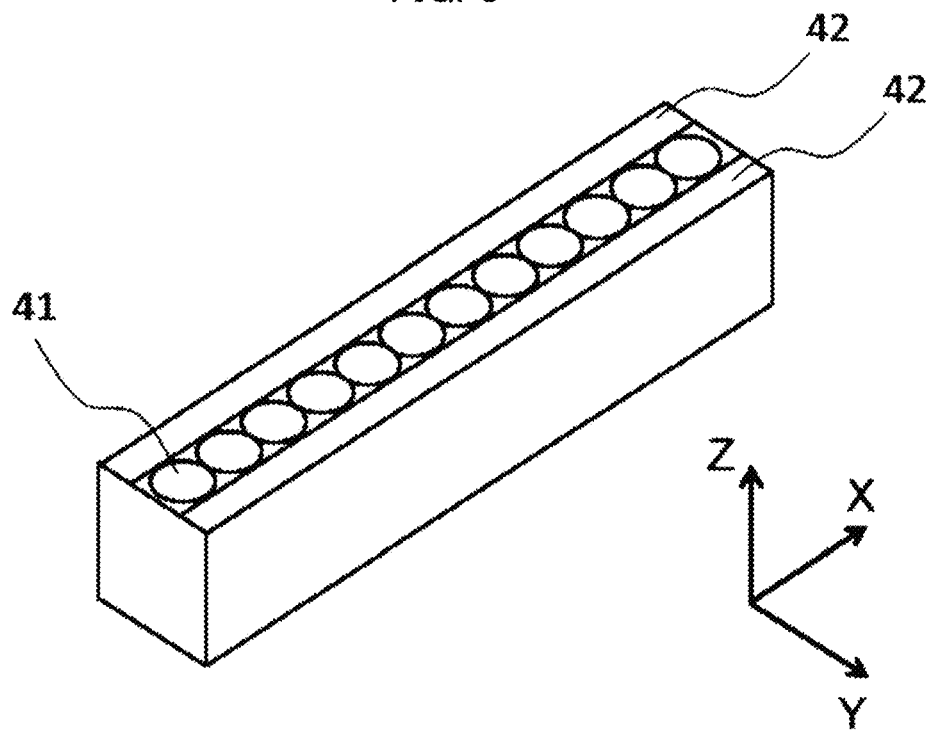
FIG. 3 is a perspective view of a lens array included in the image reading device according to Embodiment 1 of the present disclosure.
Figure 4:
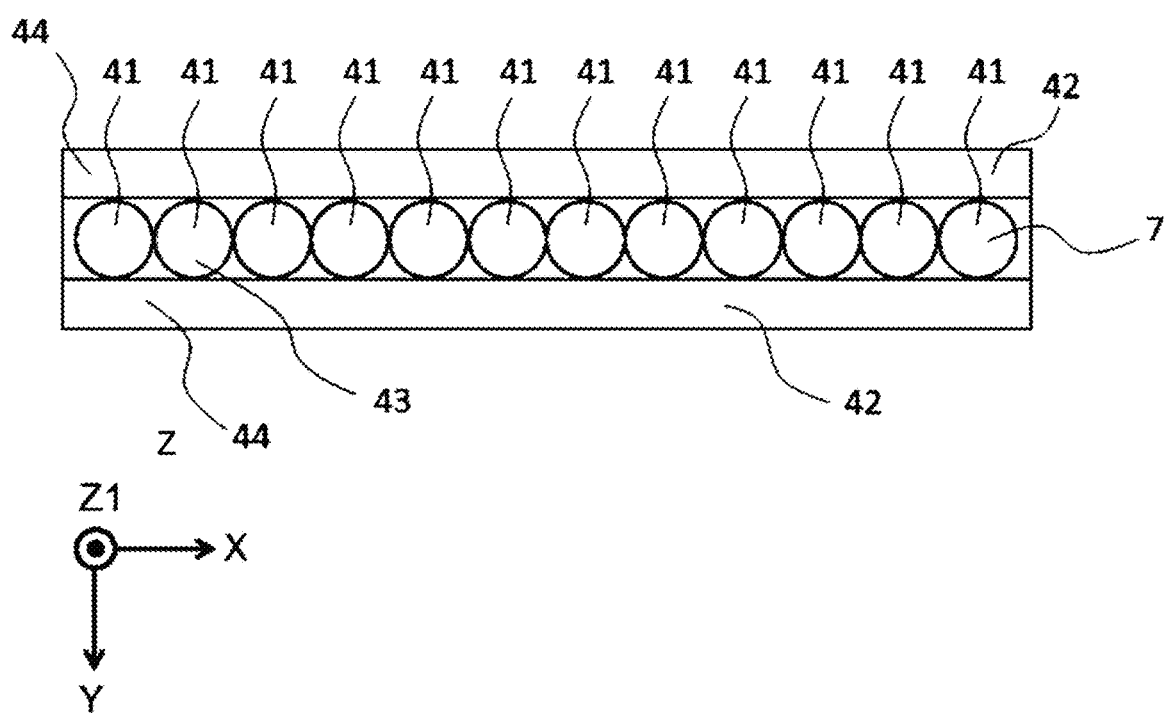
FIG. 4 is a top view of the lens array included in the image reading device according to Embodiment 1 of the present disclosure, as viewed in an optical-axis direction.

Next, the lens array 7 is described in detail with reference to FIGS. 3 and 4. FIG. 3 is a perspective view of a lens array 7 included in the image reading device according to Embodiment 1 of the present disclosure. FIG. 4 is a top view of the lens array 7 included in the image reading device according to Embodiment 1 of the present disclosure, as viewed in the optical-axis direction (Z-axis direction).

As illustrated in FIGS. 3 and 4, the lens array 7 includes lens bodies 41 arranged in the main scanning direction (X-axis direction). The lens body 41 converges light, from the reading target, passed through the transparent plate 2.

The lens array 7 of the embodiments of the present disclosure is a rod lens array. The rod lens array has a configuration in which rod lenses are arrayed. The rod lenses are formed of glass, other inorganic materials, resin, or the like. The rod lenses have a refractive index distribution in a radial direction that allows forming of an erect unmagnified image with a predetermined aperture angle and conjugation length. The conjugation length indicates a distance from a focal point to a focal point. The rod lens is merely an example of lens that constitutes the rod lens array. Any lens array in which lens bodies, not the rod lenses, are arrayed may be used.

A holder 42 extends in the main scanning direction (X-axis direction). The holders 42 are provided on both sides of the lens array 7 in the sub-scanning direction (Y-axis direction). That is, the holders 42 hold the lens bodies 41 from both sides in the sub-scanning direction (Y-axis direction) The lens bodies 41 are arranged in a line in the main scanning direction (X-axis direction) in contact with each other.

The holder 42 is formed of resin, for example, and has a plate shape. The lens array 7 is adhered to the lens retainer plate 6 via the holder 42 with an adhesive, tape, or the like.

A light incidence surface 43 of the lens array 7 that is a surface facing the transparent plate 2 and light incidence side surfaces 44 of the holders 42 that are surfaces facing the transparent plate 2 are precisely ground and are flush with one another. Similarly, a light emission surface 45 (not illustrated) of the lens array 7 that is a surface facing the image sensor and light emission side surfaces 46 (not illustrated) of the holders 42 that are surfaces facing the image sensor 11 are precisely ground and are flush with one another.

The slit portion 12 is connected to the surface of the holder 42 facing the image sensor 11. Here, the surface of the holder 42 facing the image sensor 11 and the surface of the slit portion 12 facing the transparent plate 2 may be in contact with each other or may face each other with a space having a size less than a certain size.

Next, a characteristic optical system of the present disclosure is described using FIGS. 5 to 10. The image reading device of the present disclosure includes lens arrays 7 arranged in the main scanning direction (X-axis direction). For convenience of description, adjacent lens arrays 7 are distinguished as a lens array 71 and a lens array 72.

Figure 5:
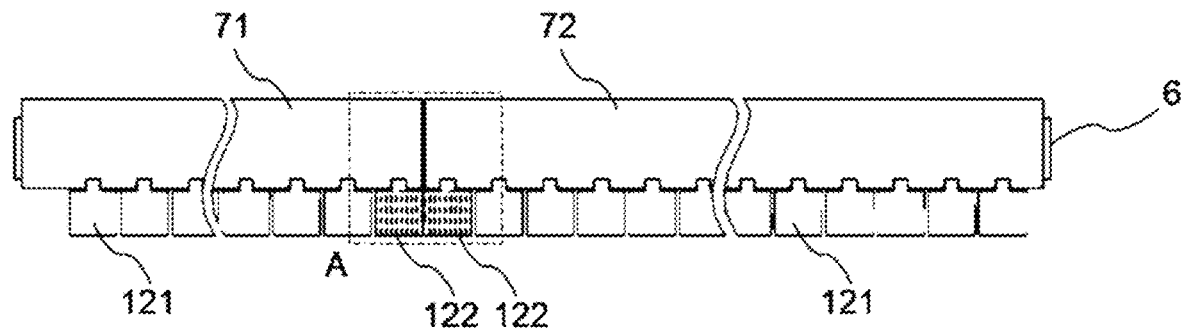
FIG. 5 is a front view of lens arrays, to which slit portions are bonded, included in the image reading device according to Embodiment 1 of the present disclosure.
Figure 5:
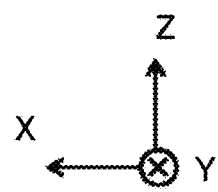
Figure 6:
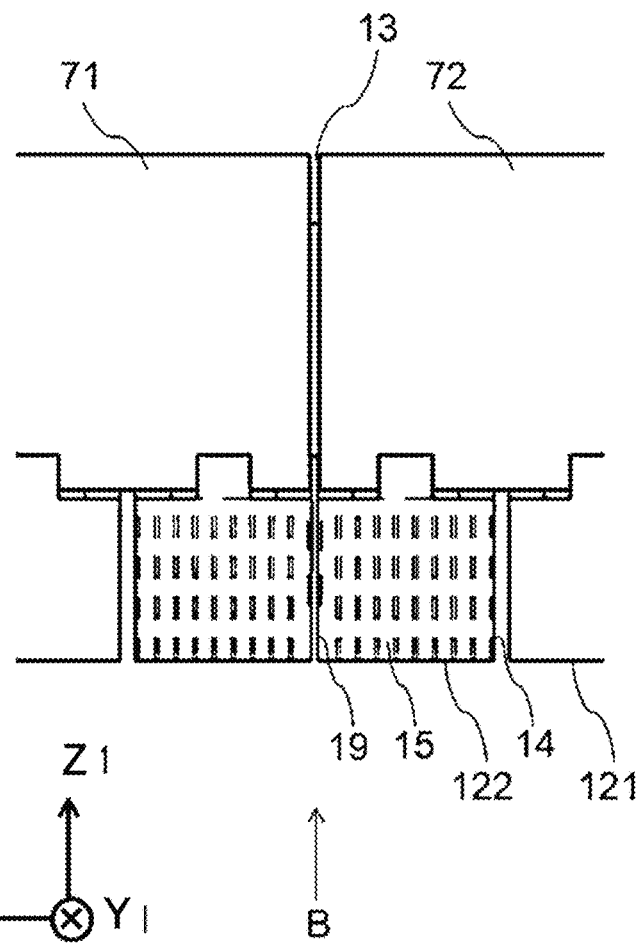
FIG. 6 is an enlarged view of portion A that is a portion connecting the lens arrays illustrated in FIG. 5.

FIG. 5 is a front view of the lens arrays 71 and 72, to which slit portions are bonded, of the image reading device 101 according to Embodiment 1 of the present disclosure. FIG. 6 is an enlarged view of portion A enclosed by a dashed-dotted line that is a portion connecting lens arrays 71 and 72 illustrated in FIG. 5. The lens arrays 71 and 72 are fixed to the lens retainer plate 6 extending in the main scanning direction (X-axis direction) by adhesion using an adhesive or a double-sided tape. The lens arrays 71 and 72 are provided with a gap 13 therebetween. That is, between the adjacent lens arrays 71 and 72, the lens bodies 41 across the gap 13 do not contact each other.

In a case where two lens arrays 71 and 72 are arranged close to each other and are bonded to a single lens retainer plate 6, since the coefficient of linear expansion of the lens retainer plate 6 is greater than the coefficient of linear expansion of the lens arrays 71 and 72, at a low temperature, the side surface of the lens array 71 comes in contact with the side surface of the lens array 72 so that the lens arrays 71 and 72 press against each other. The pressing acting on the lens arrays 71 and 72 changes the relative positional relationship of the lens bodies 41 across the gap 13. When the relative positional relationship changes, the light converged by the lens bodies 41 across the gap 13 forms an image on the image sensor 11 with positional displacement. This results in occurring a ghost in which multiple images of the reading target having different positions overlap. Therefore, the gap 13 is provided with a width that can absorb a difference between the length in the main scanning direction (X-axis direction) that the lens arrays 71 and 72 contract due to temperature decrease and the length in the main scanning direction (X-axis direction) that the lens retainer plate 6 contracts due to temperature decrease. Setting the width of the gap 13 to a predetermined width can prevent contacting and pressing against each other of the lens arrays 71 and 72 at a low temperature. As such, occurrence of ghosts between the lens arrays 71 and 72 can be suppressed.

The slit portions 12 are arranged in the main scanning direction (X-axis direction) and are fixed, using an adhesive, to the holders 42 holding the lens arrays 71 and 72 at the image sensor 11 side of the holders 42. The slit portions 12 include a first slit portion 121 and a second slit portion 122.

The second slit portion 122 is fixed to an end portion closest to the gap 13 of each of the lens arrays 71 and 72. The first slit portions 121 are fixed to portions other than the end portion closest to the gap.

Figure 7A:
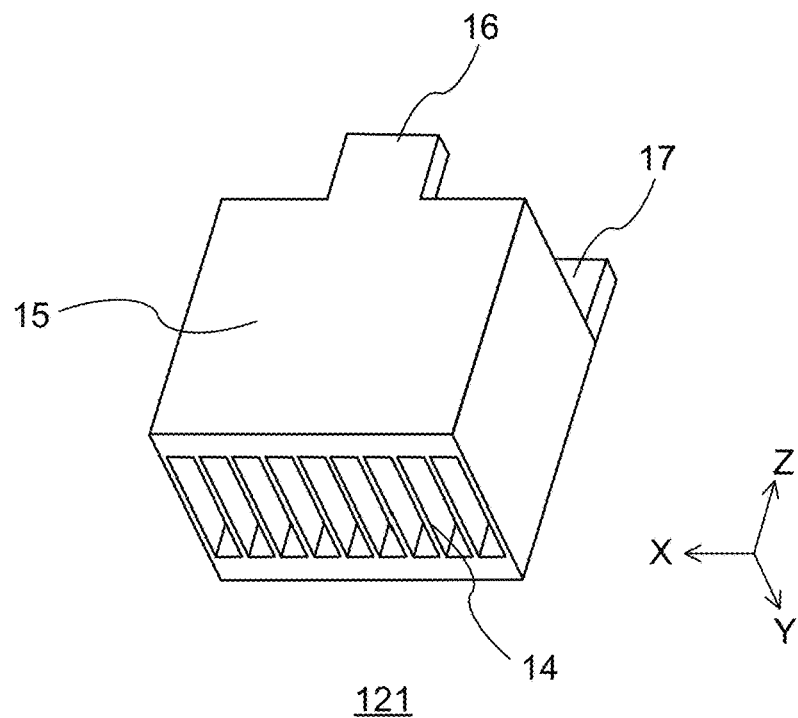
FIG. 7A is a perspective view of a first slit portion included in the image reading device according to Embodiment 1 of the present disclosure, as viewed from an image sensor side.
Figure 7B:
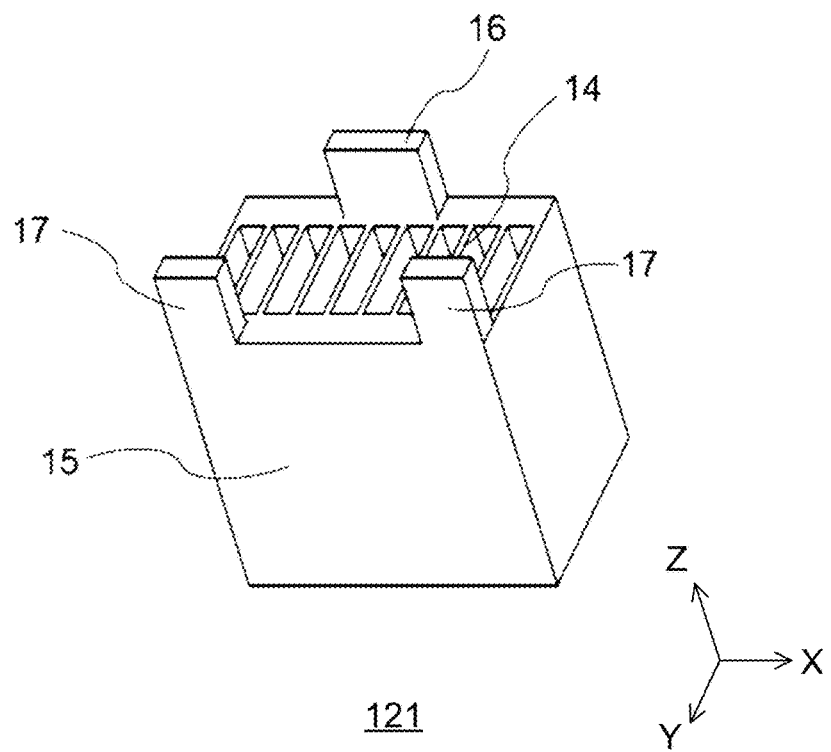
FIG. 7B is a perspective view of the first slit portion according to Embodiment 1, as viewed from a lens array side.
Figure 7C:
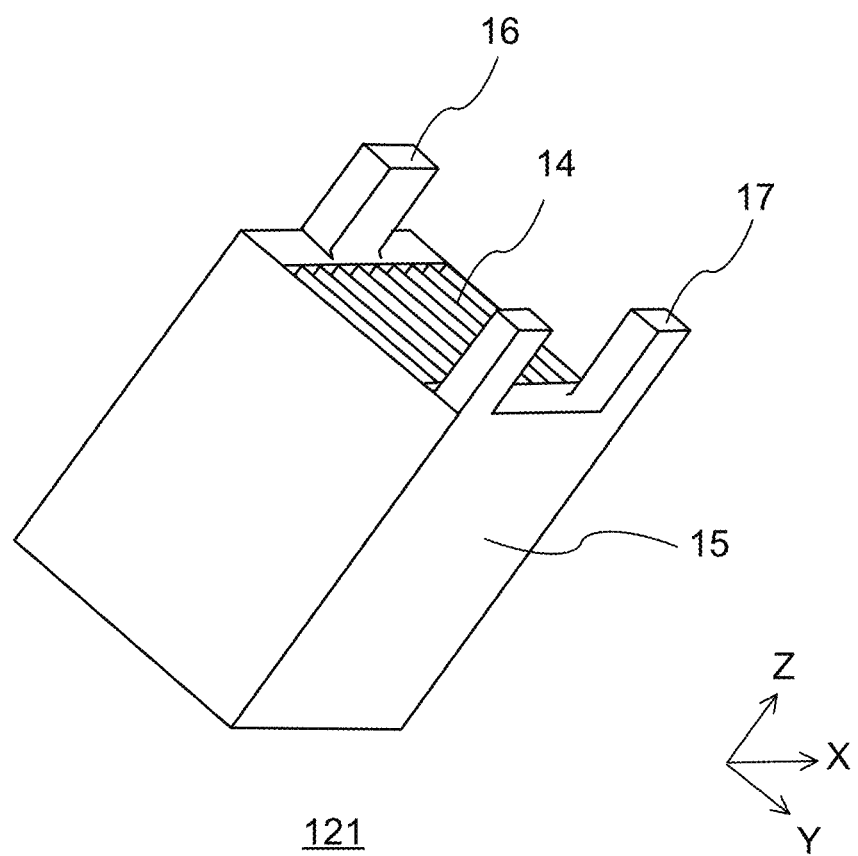
FIG. 7C is a perspective view of the first slit portion according to Embodiment 1, as viewed from an adjacent slit portion side.

The first slit portion 121 is described in detail using FIGS. 7A to 7C. FIGS. 7A to 7C are external views of a first slit portion 121 included in the image reading device 101 according to Embodiment 1 of the present disclosure. FIG. 7A is a perspective view of the first slit portion 121, as viewed from the image sensor 11 side. FIG. 7B is a perspective view of the first slit portion 121, as viewed from the lens array 7 side. FIG. 7C is a perspective view of the first slit portion 121, as viewed from adjacent slit portions 121 and 122 side.

As illustrated in FIGS. 7A to 7C, side plates 15 of the first slit portion 121 are provided on both sides of the first light shielding plates 14 in the sub-scanning direction (Y-axis direction). The side plates 15 hold the first light shielding plates 14 adjacent to one another. More specifically, light shielding plates 14 of which both ends are held by the side plates 15 in the sub-scanning direction (Y-axis direction) are arranged in parallel to each other at regular intervals in the main scanning direction (X-axis direction). Here, the light shielding plates 14 included in the first slit portion 121 are all one type of first light shielding plate 14 with the same length in the Z-axis direction. More specifically, with the first slit portion 121 attached to the lens array 7, all of the first light shielding plates 14 included in the first slit portion 121 each have an end portion closer to the image sensor 11 positioned at the same distance from the surface of the lens array 7 closer the image sensor 11 in the optical-axis direction (Z-axis direction). Protrusions 16 and 17 are provided on end surfaces of the side plates 15 facing the lens array 7. The protrusions 16 and 17 protrude from a part of the end surfaces. In the first slit portion 121 illustrated in FIGS. 7A to 7C, the protrusion 16 is provided at a single site, and the protrusions 17 are provided at two sites, but the number of the protrusions 16 and 17 may be optional.

The protrusion 16 serves as a margin for fixing the first slit portion 121 to the holder 42 of the lens array 7 with an adhesive. As illustrated in FIGS. 7A to 7C, in a case where the protrusion 16 is provided at a single site, an adhesive is easily applied since a space for installing a device or instrument to apply the adhesive can easily be secured. The device to apply an adhesive is, for example, a dispenser.

As illustrated in FIG. 2, the protrusion 17 is a portion contacting a contact surface 61 of the lens retainer plate 6. The contact surface 61 is a side surface of the lens retainer plate 6 facing the image sensor 11. The length of the protrusion 17 is determined in accordance with the position at which the lens array 7 is fixed to the lens retainer plate 6. The first slit portion 121 with two protrusions 17 of which lengths are determined in this way is fixed to the lens array 7 with both protrusions 17 in contact with the contact surface 61 of the lens retainer plate 6. Thus, the position and orientation of the slit portions 121 and 122 can be determined. When the slit portions 121 and 122 are viewed from the sub-scanning direction (Y-axis direction), the first light shielding plate 14 and the optical axis of the lens array 7 are easily in parallel with each other.

Figure 8A:
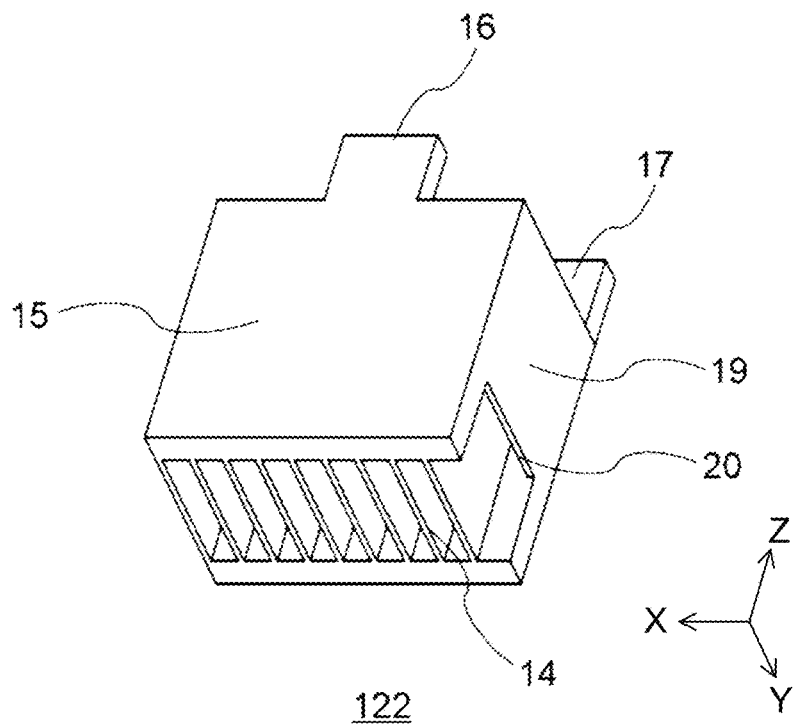
FIG. 8A is a perspective view of a second slit portion included in the image reading device according to Embodiment 1 of the present disclosure, as viewed from the image sensor side.
Figure 8B:
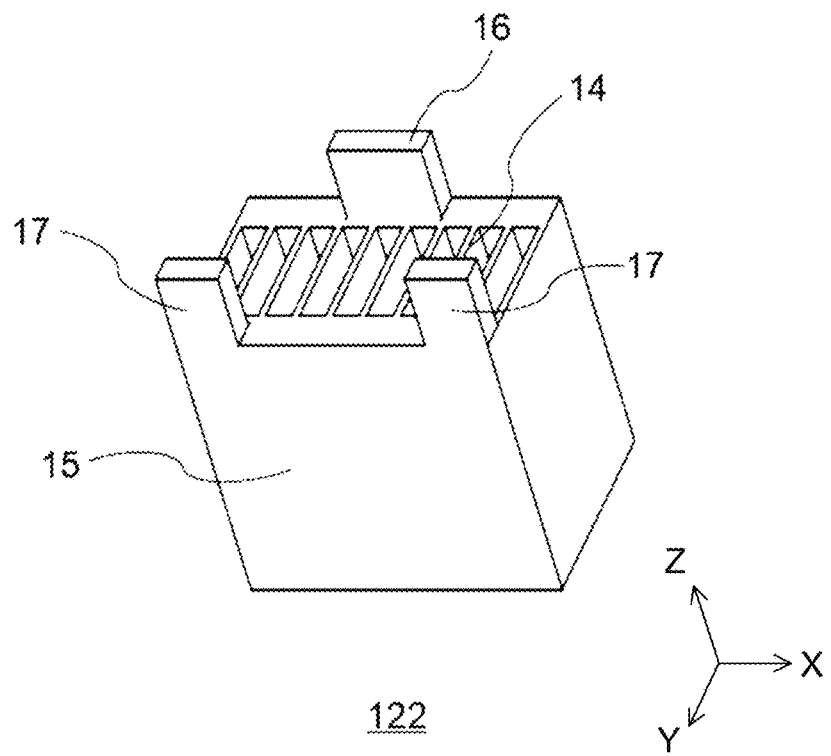
FIG. 8B is a perspective view of the second slit portion according to Embodiment 1, as viewed from the lens array side.
Figure 8C:
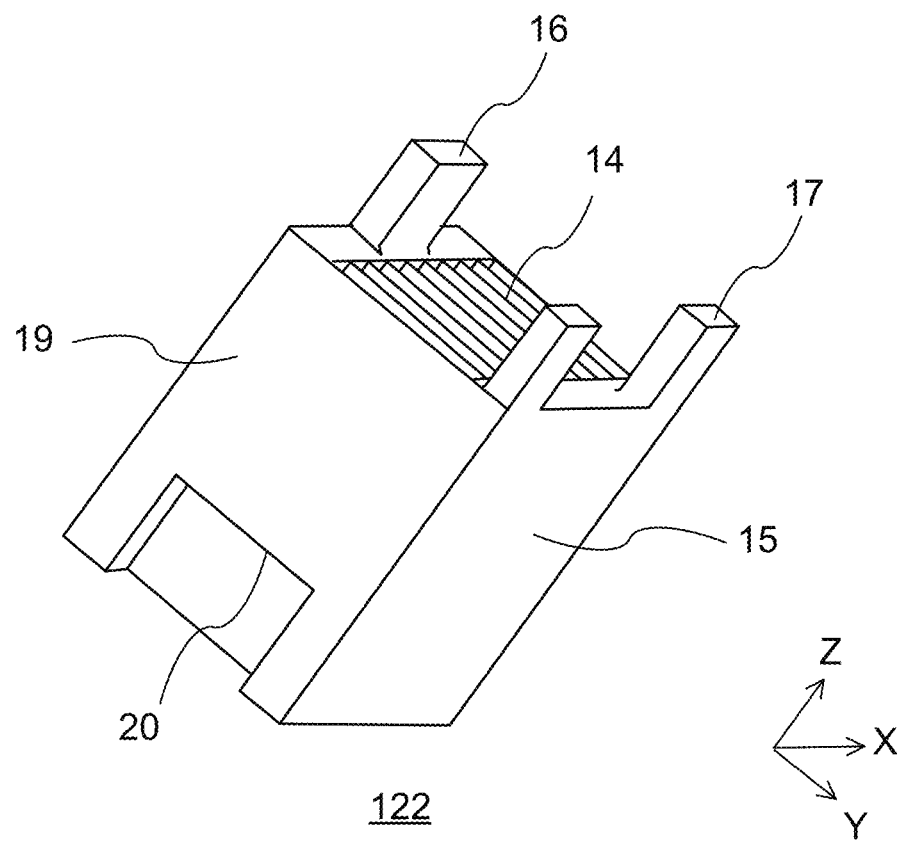
FIG. 8C is a perspective view of the second slit portion according to Embodiment 1, as viewed from a gap side.

Next, the second slit portion 122 is described in detail using FIGS. 8A to 8C. FIGS. 8A to 8C are external views of a second slit portion 122 included in the image reading device 101 according to Embodiment 1 of the present disclosure. FIG. 8A is a perspective view of the second slit portion 122, as viewed from the image sensor 11 side. FIG. 8B is a perspective view of the second slit portion 122, as viewed from the lens array 7 side. FIG. 8C is a perspective view of the second slit portion 122, as viewed from the gap 13 side.

As illustrated in FIGS. 8A to 8C, side plates 15 of the second slit portion 122 are provided on both sides of the first light shielding plates 14 in the sub-scanning direction (Y-axis direction). The side plates 15 hold the first light shielding plates 14 and a second light shielding plate 19. That is, the first light shielding plates 14 and the single second light shielding plate 19 of which both ends are held by the side plates 15 in the sub-scanning direction (Y-axis direction) are arranged in parallel to each other at regular intervals in the main scanning direction (X-axis direction). Similarly to the first slit portion 121, protrusions 16 and 17 are provided on side plates 15 of the second slit portion 122 on the lens array 7 side.

The protrusion 16 and the protrusion 17 of the second slit portion 122 have the same configuration as the protrusion 16 and the protrusion 17 of the first slit portion 121, and achieve the same functions and effects.

The second light shielding plate 19 of the second slit portion 122 has a notch 20. That is, the position (lower end) of an end of the second light shielding plate 19 at the image sensor 11 side in the optical-axis direction (Z-axis direction) is closer to the lens array 7 (upper side) than the first light shielding plates 14 are. In other words, the end portion of the second light shielding plate 19 facing the image sensor 11 is closer to the lens array 7 than the first light shielding plates 14 are. The second light shielding plate 19 is applied only to one of the light shielding plates at either end of the second slit portion 122 in the main scanning direction (X-axis direction). The other light shielding plates of the second slit portion 122 including a light shielding plate at the other end are the first light shielding plates 14 having no notch 20.

Note that in a case where one slit portion is provided for one lens array 7, only a single third slit portion is provided for one lens array 7. The single third slit portion provided for one lens array 7 includes second light shielding plates 19 on both ends in the main scanning direction (X-axis direction). The light shielding plates provided between the both ends of the third slit portion in the main scanning direction (X-axis direction) are first light shielding plates 14 having no notch 20. Note that slit portions including at least one second light shielding plate 19, including the third slit portion, may also be referred to as a second slit portion collectively.

The first slit portion 121, the second slit portion 122, and the third slit portion are each a molded article of resin. The first slit portion 121, the second slit portion 122, and the third slit portion each have a different shape, and thus, are prepared using different dies. In a case where more than one slit portions 12 are provided for one lens array 7, the first slit portion 121 is provided at a portion where there is no adjacent lens array 7. Furthermore, in a case where three or more slit portions 12 are provided for one lens array 7, the first slit portion 121 is also provided at a portion that is not both ends of one lens array 7.

The first light shielding plates 14 have the same thickness in any of the first slit portion 121, the second slit portion 122, and the third slit portion. The first shading plates 14 and the second shading plates 19 have the same thickness.

Figure 9:
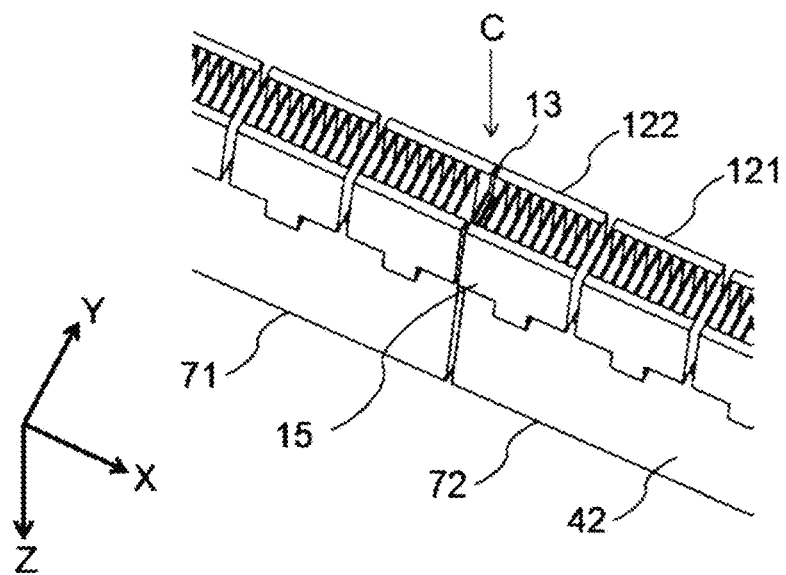
FIG. 9 is a perspective view of slit portions and lens arrays, as viewed from B side illustrated in FIG. 6 (from the image sensor side)
Figure 10:
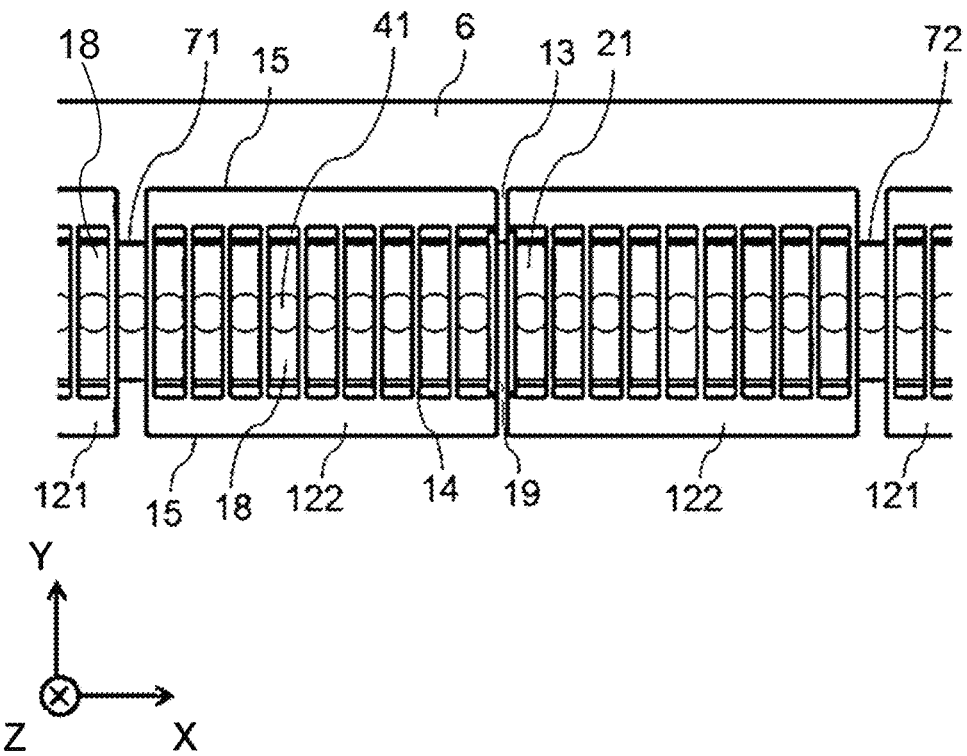
FIG. 10 is a bottom view of the lens arrays to which the slit portions are bonded, as view from direction C illustrated in FIG. 9.

FIG. 9 is a perspective view of slit portions 12 and lens arrays 7, as viewed from B side illustrated in FIG. 6 (from the image sensor 11 side). FIG. 10 is a bottom view of the lens arrays 71 and 72, to which slit portions 12 are bonded, as view from direction C illustrated in FIG. 9. As illustrated in FIGS. 9 and 10, the first slit portion 121 includes a plurality of optical through paths 18 provided along the main scanning direction (X-axis direction). The optical through path 18 is a region surrounded by opposing first light shielding plates 14 and opposing side plates 15. The second slit portion 122 includes a plurality of optical through paths 18 provided along the main scanning direction (X-axis direction). The optical through path 18 is a region surrounded by opposing first light shielding plates 14 and opposing side plates 15. Furthermore, the second slit portion 122 includes an optical through path 21 provided at one end in the main scanning direction (X-axis direction). The optical through path 21 is a region surrounded by the first light shielding plate 14, the second light shielding plate 19, and the side plates 15. Each of the center lines of the optical through paths 18 and the optical through path 21 is preferably aligned with the optical axis of the corresponding lens body 41.

The center line of the optical through path 21 at one end of the second slit portion 122 is preferably aligned with the optical axis of the lens body 41 closest to the gap 13 of each of the lens arrays 71 and 72. At the other end of the second slit portion 122, the first slit portion 121 is arranged with a space from the second slit portion 122 for one optical path of the lens body 41.

The first light shielding plate 14 is provided at a position where one lens body 41 and an adjacent another lens body 41 are in contact with each other between the lens array 7 and the image sensors 11. The first light shielding plate 14 has an end portion closer to the image sensor 11 positioned at the predetermined distance from the surface of the lens array 7 closer the image sensor 11 in the optical-axis direction (Z-axis direction). The first light shielding plate 14 separates light passed through the lens bodies 41. More specifically, the first light shielding plate 14 does not completely separate light passed through the lens bodies. The first light shielding plate 14 generates a state in which an optical path of light passed through one lens body 41 overlaps, on a surface of the image sensor 11 facing the lens array 7, another optical path of light passed through an adjacent lens body 41, and the length of the overlapping region in the main scanning direction (X-axis direction) is a determined length. The length of the region in the main scanning direction in which optical paths of light passed through the lens bodies 41 overlap on the surface of the image sensor 11 facing the lens array 7 may also be referred to as a visual field overlap degree. Separating the light passed through the lens bodies 41 in an overlapping state with a determined visual field overlap degree is also expressed as separating the optical paths of light passed through the lens bodies 41.

The second light shielding plate 19 restricts the optical path of the lens body 41 at the end position of the lens array 7 in the main scanning direction (X-axis direction), that is, the position closest to the gap 13, at the gap 13 side of the lens array 7 in the main scanning direction (X-axis direction). The position of the second light shielding plate 19 at the image sensor 11 side in the direction along the optical axis is closer to the lens array 7 than the first light shielding plates 14 are. That is, the end portion of the second light shielding plate 19 facing the image sensor 11 is closer to the lens array 7 than the first light shielding plates 14 are. In other words, in the optical-axis direction (Z-axis direction), the distance from the surface of the lens array 7 facing the image sensor 11 to the end portion of the second light shielding plate 19 facing the image sensor 11 is shorter than the distance from the surface of the lens array 7 facing the image sensor 11 to the end portion of the first light shielding plate 14 facing the image sensor 11. The field of view of the lens body 41 restricted by the second light shielding plate 19 overlaps the field of view of the lens body 41 adjacent to the lens body 41 with the gap 13 therebetween on the surface of the image sensor 11 facing the lens array 7. More specifically, in a state in which the optical path of light passed through the lens body 41 of the lens array 71 closest to the gap 13 and the optical path of light passed through the lens body 41 closest to the gap 13 of the lens array 72 overlap at the determined visual field overlap degree, the second light shielding plate 19 separates the light passed through the two lens bodies 41 closest to the gap 13. That is, the second light shielding plate 19 generates a state in which the length in the main scanning direction (X-axis direction) of the overlapping region is a determined length. The overlapping region is a region in which the optical paths of light passed through the two lens bodies 41 closest to the gap 13 overlap.

Figure 11:
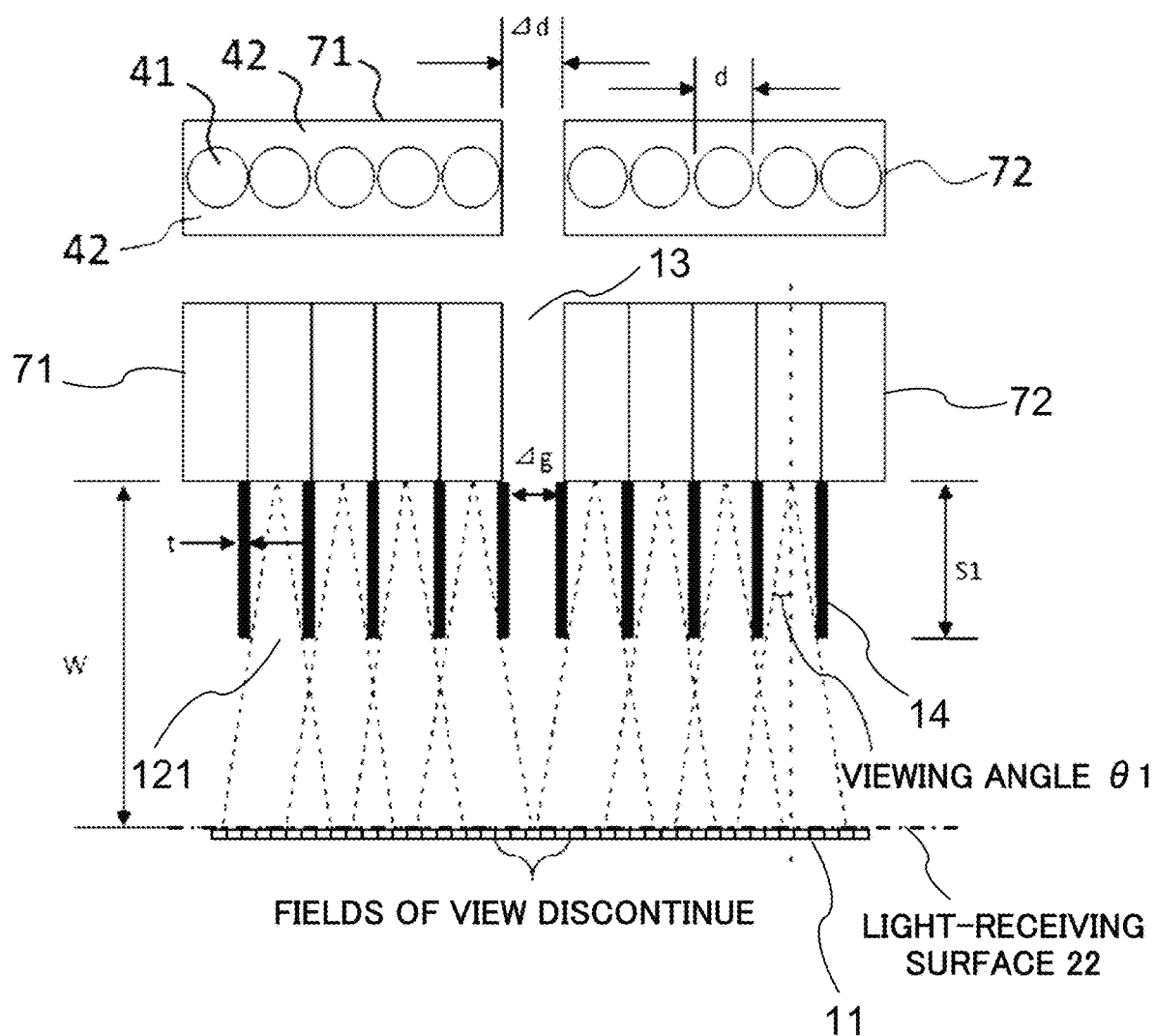
FIG. 11 is a schematic diagram for explanation of a problem occurred in a case where there is no second light shielding plate 19 in the image reading device according to Embodiment 1 of the present disclosure.
Figure 12:
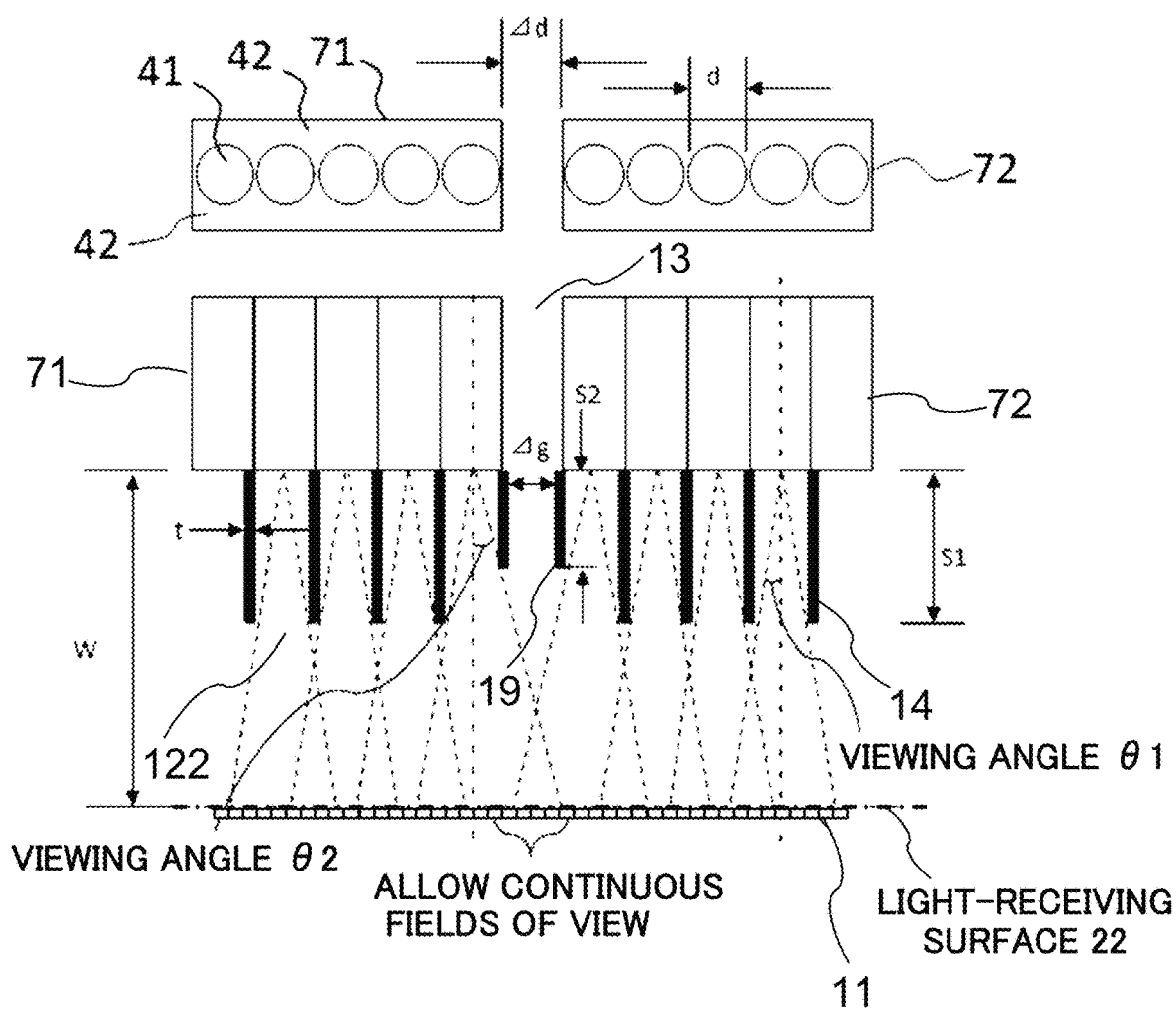
FIG. 12 is a schematic diagram for explanation of an effect of the second light shielding plate 19 of the image reading device according to Embodiment 1 of the present disclosure.

An effect of the second light shielding plate 19 is described using FIGS. 11 and 12. FIG. 11 is a schematic diagram for explanation of a problem occurred in a case where there is no second light shielding plate 19 in the image reading device 101 according to Embodiment 1 of the present disclosure. FIG. 12 is a schematic diagram for explanation of an effect of the second light shielding plate 19 of the image reading device 101 according to Embodiment 1 of the present disclosure. FIG. 11 illustrates a case where only the first light shielding plates 14 are installed in the lens array 7. FIG. 12 illustrates a case to which the present disclosure is applied and where the light shielding plate closest to the gap 13 of the lens array 7 is the second light shielding plate 19.

A spacing Ag between the adjacent slit portions 12 and a spacing Ad of the gap 13 between the lens arrays 71 and 72, illustrated in FIGS. 11 and 12 are determined assuming a lower temperature during the use or storage of the image reading device 101 compared to during the assembly. Specifically, the spacing Ag between the adjacent slit portions 12 is set to a width that can absorb the difference in contracting length caused by the difference between the coefficients of linear expansion of the lens arrays 71 and 72 and the coefficient of linear expansion of the lens retainer plate 6. The spacing Ad of the gap 13 between the lens arrays 71 and 72 is required to be at least a spacing obtained by adding a light shielding plate thickness t to the difference between the length in the main scanning direction (X-axis direction) that the lens arrays 71 and 72 contract due to temperature decrease and the length in the main scanning direction (X-axis direction) that the lens retainer plate 6 contracts due to temperature decrease.

As illustrated in FIG. 11, the first light shielding plates 14 are disposed on surfaces of the lens arrays 71 and 72 in which the lens bodies 41 having a diameter d are arranged. The surfaces of the lens arrays 71 and 72 face the light-receiving surface 22 of the image sensor 11. A thickness of the first light shielding plate 14 is defined as t. A distance between an end of the first light shielding plate 14 facing the light-receiving surface 22 in the optical-axis direction (Z-axis direction) and the surfaces of the lens arrays 71 and 72 facing the light-receiving surface 22 is defined as S1. The light converged by the lens body 41 is emitted from the lens body 41 as an optical path. A maximum value (viewing angle) of the angle that the optical path spreads relative to the optical axis is restricted to $\theta 1$ by the first light shielding plate 14. The viewing angle $\theta 1$ changes in accordance with the distance S1. The greater the distance S1, the smaller the viewing angle $\theta 1$. The smaller the distance S1, the greater the viewing angle $\theta 1$. By the first light shielding plate 14 narrowing the viewing angle $\theta 1$, the overlap of the optical paths of light passed through the adjacent lens bodies 41 becomes smaller. By reducing the overlap of optical paths of light passed through the adjacent lens bodies 41, a distance W can be increased. Commonly, the smaller viewing angle $\theta 1$ achieves a greater effect in improvement of the distance W. Note that the distance W corresponds to the depth of field.

However, the viewing angle, at the gap 13 side, of the lens body 41 closest to the gap 13 of the lens array is similarly restricted to the viewing angle $\theta 1$ by the first light shielding plate 14 having the distance S1. Therefore, the fields of view of the lens bodies 41 overlap on the light-receiving surface 22 of the image sensor 11 at portions other than the gap 13, whereas the fields of view of the lens bodies 41 across the gap 13 do not overlap on the light-receiving surface 22 of the image sensor 11 at a portion of the gap 13 between the lens arrays 71 and 72. In a case where the fields of view of the lens bodies 41 do not overlap on the light-receiving surface 22 of the image sensor 11, the read images discontinue at a site where the fields of view do not overlap.

As illustrated in FIG. 12, the second light shielding plates 19 are arranged at the gap 13 side of the lens bodies 41 closest to the gap 13 of the lens arrays 71 and 72 in the present disclosure. A thickness of the second light shielding plate 19 is defined as t. A distance between an end of the second light shielding plate 19 facing the image sensor in the optical-axis direction (Z-axis direction) and the surfaces of the lens arrays 71 and 72 facing the image sensor is defined as S2. The relationship between the distance S1 and the distance S2 is represented as S1>S2. The viewing angle $\theta 2$ restricted by the second light shielding plate 19 at the gap 13 side is greater than the viewing angle $\theta 1$ restricted by the first light shielding plate 14.

The fields of view of two lens bodies 41 across the gap 13 should overlap on the light-receiving surface 22 of the image sensor 11 for continuous read images of the image reading device 101 between the lens array 71 and the lens array 72. The distance S2 of the second light shielding plate 19 is determined to a distance that the fields of view of the lens bodies 41 restricted to the viewing angle $\theta 2$ by the second light shielding plates 19 overlap on the light-receiving surface 22 of the image sensor 11 at the predetermined visual field overlap degree.

Formula (1) below is to be satisfied for overlapping of the fields of view of the lens bodies 41 restricted to the viewing angle $\theta 2$ on the light-receiving surface 22 of the image sensor 11. The distance S2 of a case where the viewing angle $\theta 2$ satisfies Formula (1) may be determined.

$$W \cdot \tan(\theta 2) \geq d/2 + \Delta d/2 \quad (1)$$

As described above, the gap spacing Ad is determined to a width that can absorb the difference in contracting length caused by the difference between the coefficients of linear expansion of the lens arrays 71 and 72 and the coefficient of linear expansion of the lens retainer plate 6 upon decreasing of environmental temperature. Conversely, upon increasing of environmental temperature, the spacing Ad of the gap 13 increases. Therefore, even upon increasing of environmental temperature, it is preferable to determine the values of the spacing Ad of the gap 13 and the distance S2 that allow the fields of view to overlap on the light-receiving surface 22 of the image sensor 11.

Accordingly, the use of the present disclosure allows to obtain an image reading device 101 that can endure a use environment in which the ambient temperature changes and obtain continuous read images between the lens arrays 7 even in a case where a plurality of lens arrays 7 arranged in the main scanning direction (X-axis direction) with a gap 13 between adjacent lens arrays 7 are used with a predetermined depth of field.

A first overlap region in which fields of view of the lens bodies 41 restricted by the first light shielding plates 14 overlap and a second overlap region in which fields of view of the lens bodies 41 restricted by the second light shielding plates 19 overlap may have a same length in the main scanning direction (X-axis direction). Here, the first overlap region is a region in which the optical paths of light passed through two adjacent lens bodies 41 are restricted to the viewing angle $\theta 1$ by the first light shielding plate 14, and then overlap on the light-receiving surface 22 of the image sensor 11 facing the lens array. Furthermore, the second overlap region is a region in which the optical paths of light passed through two adjacent lens bodies 41 are restricted to the viewing angle $\theta 2$ by the second light shielding plates 19, and then overlap on the light-receiving surface 22 of the image sensor 11. That is, the visual field overlap degree of the lens bodies 41 restricted to the viewing angle $\theta 1$ may be the same as the visual field overlap degree of the lens bodies 41 restricted to the viewing angle $\theta 2$. As such, a light intensity difference between the first overlap region including no gap 13 and the second overlap region including a gap 13 can be reduced.

As described above, the image reading device 101 according to Embodiment 1 includes a plurality of lens arrays 7 arranged in the main scanning direction with a gap 13 between the adjacent lens arrays 7 and each including a plurality of lens bodies 41 arranged in the main scanning direction, and image sensors 11 to receive light converged by the lens bodies. The image reading device 101 further includes a plurality of slit portions 12 arranged in the main scanning direction between the lens array 7 and the image sensors 11. One or more of the plurality of slit portions 12 are provided for one lens array 7. The plurality of slit portions 12 include a second slit portion 122 that is a slit portion including a first light shielding plate 14 and a second light shielding plate 19. The first light shielding plate 14 separates an optical path of light passed through one lens body 41 from another optical path of light passed through an adjacent lens body 41. The second light shielding plate 19 restricts an optical path of light passed through a lens body 41 closest to a gap 13 at the gap 13 side in the main scanning direction. The position of the second light shielding plate 19 at the image sensor 11 side in the direction along the optical axis is closer to the lens array 7 than the first light shielding plates are. As such, the field of view of the lens body 41 representing a spread of the restricted optical path overlaps the field of view of the adjacent lens body 41 adjacent to the lens body 41 with the gap 13 therebetween on the surface of the image sensor 11 facing the lens array 7. In a case where more than one slit portions of the plurality of slit portions 12 are provided for one lens array 7, the plurality of slit portions 12 also include a first slit portion 121 that is a slit portion including only first light shielding plates 14. As a result, discontinuous read images at the gap portions between the lens arrays 7 can be avoided even in a case where the plurality of lens arrays 7 arranged in the main scanning direction with the gap 13 between adjacent lens arrays 7 are used with a determined depth of field by providing the slit portions 12 between the lens array 7 and the image sensors 11 to restrict the field of view of the lens body 41.

Embodiment 2

An image reading device 102 according to Embodiment 2 is described below with reference to FIGS. 13 to 16. The second slit portion 122 included in the image reading device 101 according to Embodiment 1 is a molded article of resin. In contrast, a second slit portion 124 included in the image reading device 102 according to Embodiment 2 is a combination of a first slit portion 123 and a second light shielding plate 24 included in the image reading device 102 according to Embodiment 2. The other components are substantially the same as the components in Embodiment 1. The same reference signs denote the same or corresponding components described in Embodiment 1 above, and such components are not described repeatedly.

Figure 13A:
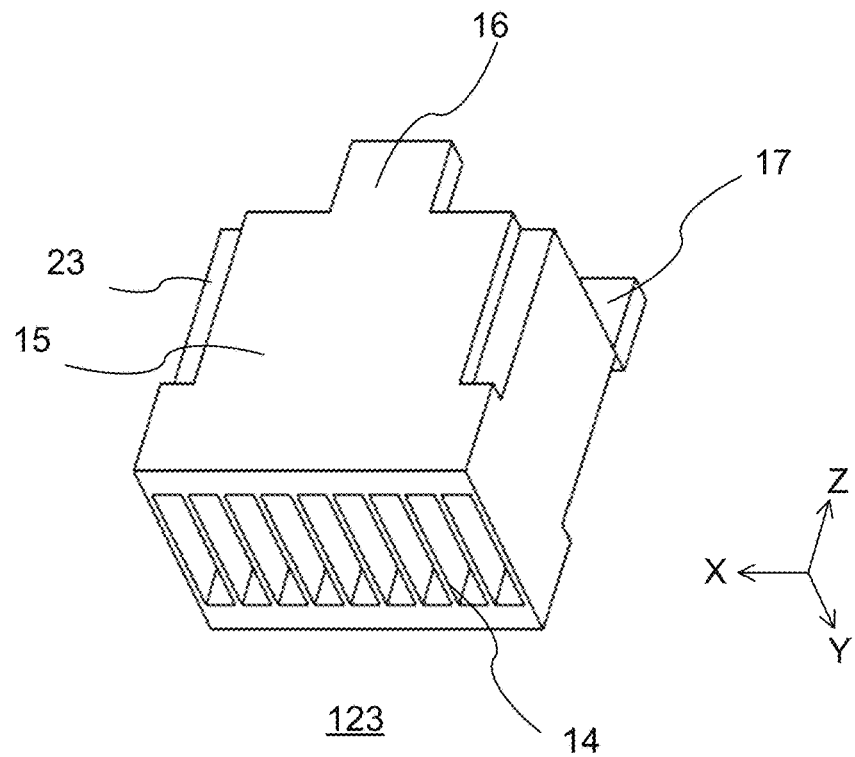
FIG. 13A is a perspective view of a first slit portion included in an image reading device according to Embodiment 2 of the present disclosure, as viewed from an image sensor side.
Figure 13B:
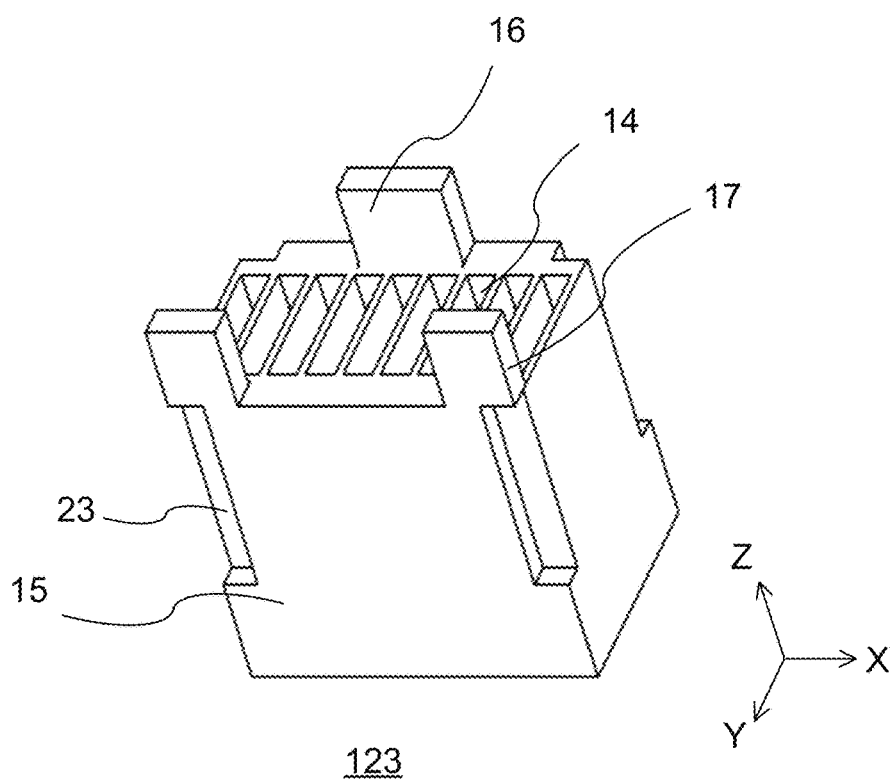
FIG. 13B is a perspective view of the first slit portion according to Embodiment 2, as viewed from a lens array side.

FIGS. 13A and 13B are external views of a first slit portion 123 of the image reading device 102 according to Embodiment 2 of the present disclosure. FIG. 13A is a perspective view of the first slit portion 123, as viewed from the image sensor 11 side. FIG. 13B is a perspective view of the first slit portion 123, as viewed from the lens array 7 side. As illustrated in FIGS. 13A and 13B, the first slit portion 123 according to Embodiment 2 has side plates 15. The side plates 15 have four recesses 23 at end portions in the main scanning direction. The recess 23 has a length in the optical-axis direction (Z-axis direction) shorter than the length of the first light shielding plate 14.

Figure 14:
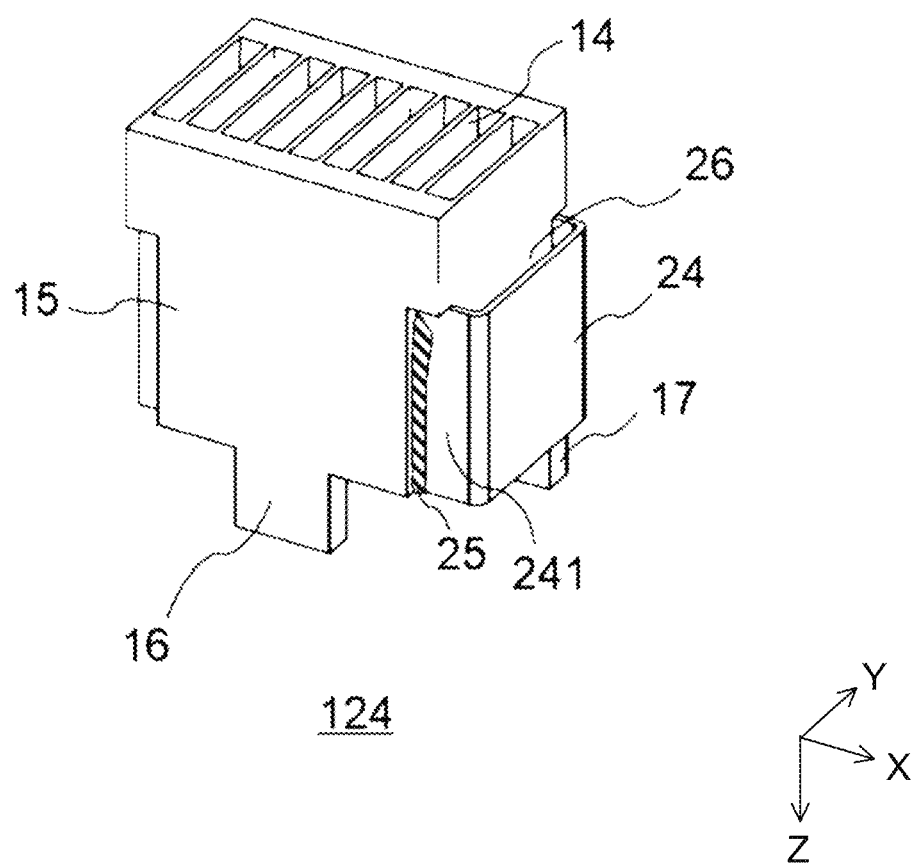
FIG. 14 is a perspective view of a second slit portion included in the image reading device according to Embodiment 2 of the present disclosure, as viewed from the image sensor side.

FIG. 14 is a perspective view of a second slit portion 124 of the image reading device 102 according to Embodiment 2 of the present disclosure, as viewed from the image sensor 11 side. As illustrated in FIG. 14, the second light shielding plate 24 includes a body portion parallel to the first light shielding plate 14 and side portions 241 obtained by bending both sides of the body portion. The second slit portion 124 is a combination of the first slit portion 123 and the second light shielding plate 24 by fixing the side portions 241 to the recesses 23 with an adhesive 25. The side portions 241 of the second light shielding plate 24 are fitted only into the recesses 23 of the side plates 15 at one end.

Figure 15:
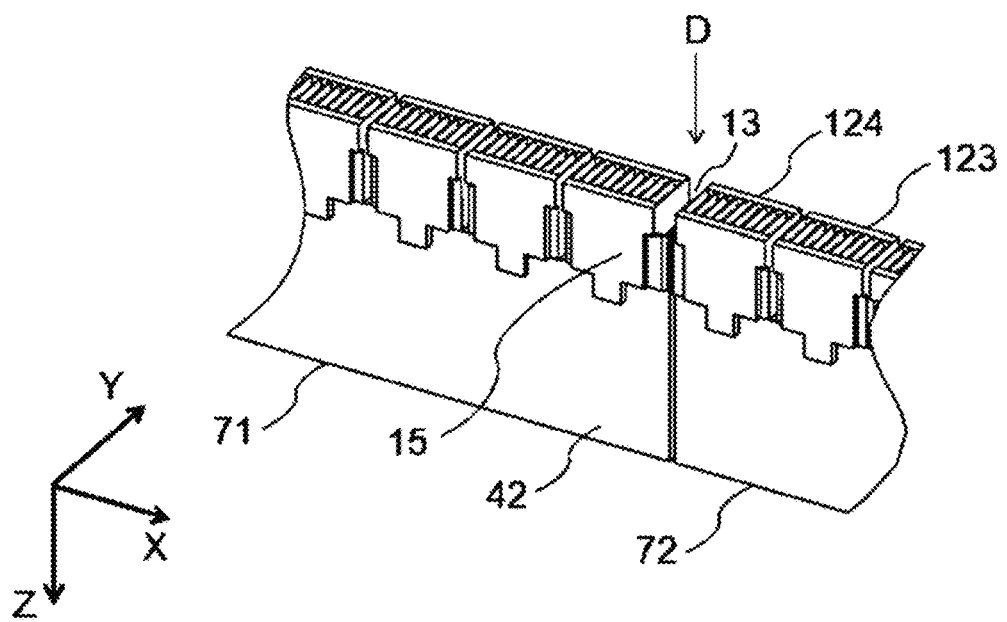
FIG. 15 is a perspective view of lens arrays, to which slit portions are bonded, included in the image reading device according to Embodiment 2 of the present disclosure.
Figure 16:
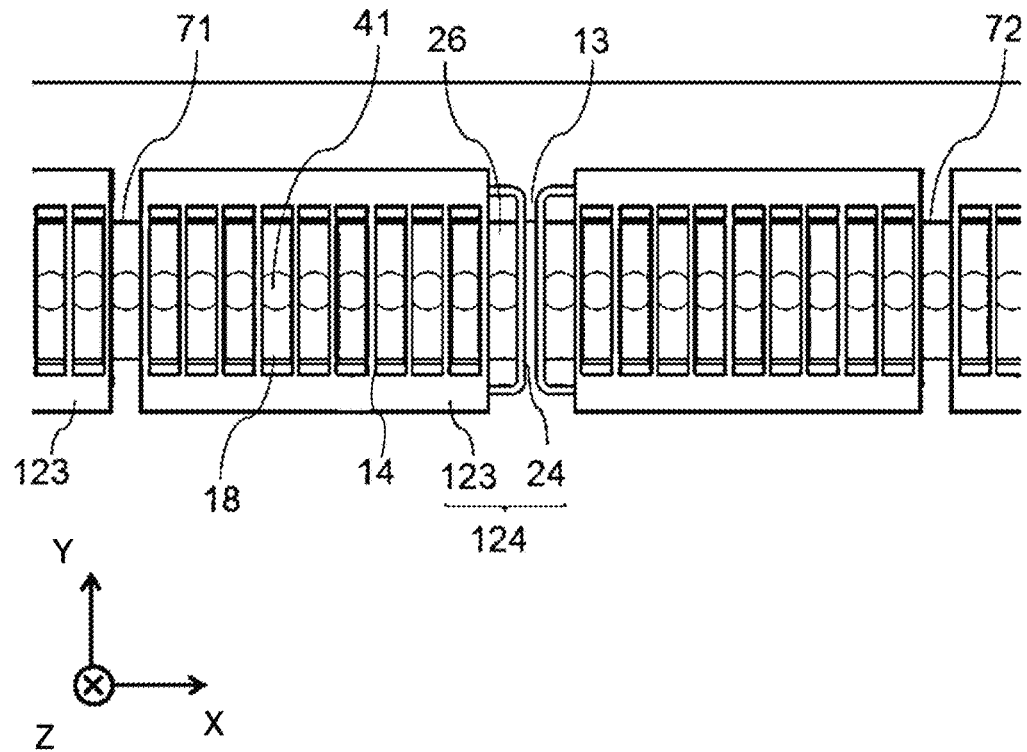
FIG. 16 is a top view of the lens arrays, to which the slit portions are bonded, included in the image reading device according to Embodiment 2 of the present disclosure.

FIG. 15 is a perspective view of the lens arrays 71 and 72 to which slit portions 123 and 124 of the image reading device 102 according to Embodiment 2 of the present disclosure are bonded. FIG. 16 is a top view of FIG. 15, as viewed from a D side. As illustrated in FIGS. 15 and 16, the first slit portions 123 and the second slit portions 124 are bonded to the lens arrays 71 and 72 at the image sensor 11 side. The center line of an optical through path 26 defined by the first light shielding plate 14, the second light shielding plate 24, and the side plates 15 aligns with the optical axis of the lens body 41 closest to the gap 13 of the lens array 7.

As described above, by preliminary providing the recesses 23 to the molded article of the first slit portion 123, and then adhering the second light shielding plate 24 thereto as needed, preparing of a die dedicated to the second slit portion 124 is unnecessary. This can reduce costs for dies and types of component.

Embodiment 3

An image reading device 103 according to Embodiment 3 is described below with reference to FIGS. 17A to 20. The second slit portion 122 included in the image reading device 101 according to Embodiment 1 is a molded article of resin. In contrast, a second slit portion 126 included in the image reading device 103 according to Embodiment 3 is a combination of a first slit portion 125 and a second light shielding plate 28. The other components are substantially the same as the components in Embodiment 1. The same reference signs denote the same or corresponding components described in Embodiment 1 above, and such components are not described repeatedly.

Figure 17A:
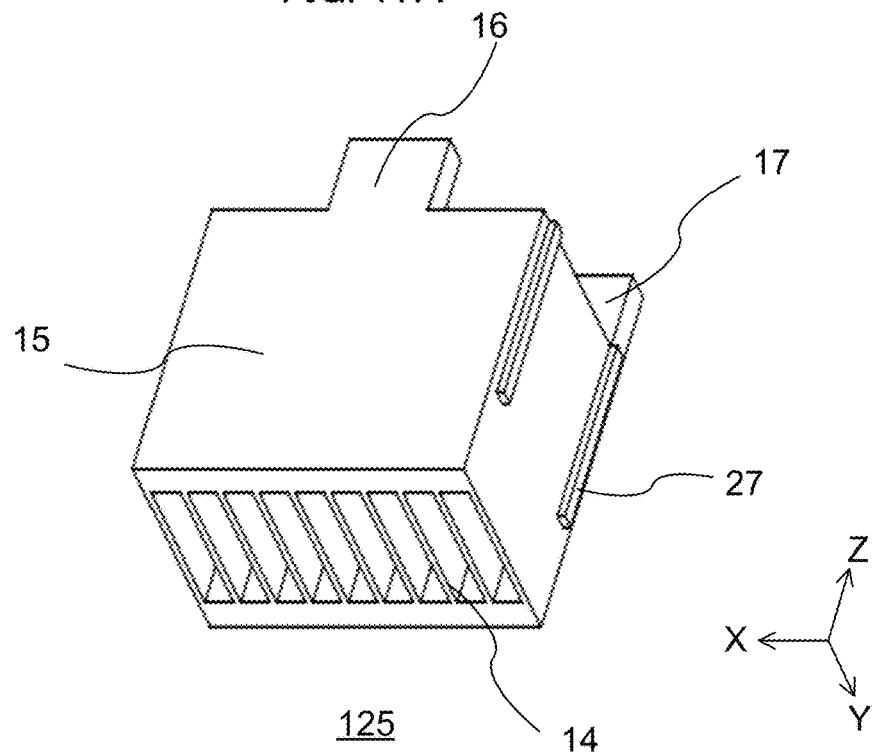
FIG. 17A is a perspective view of a first slit portion included in an image reading device according to Embodiment 3 of the present disclosure, as viewed from an image sensor side.
Figure 17B:
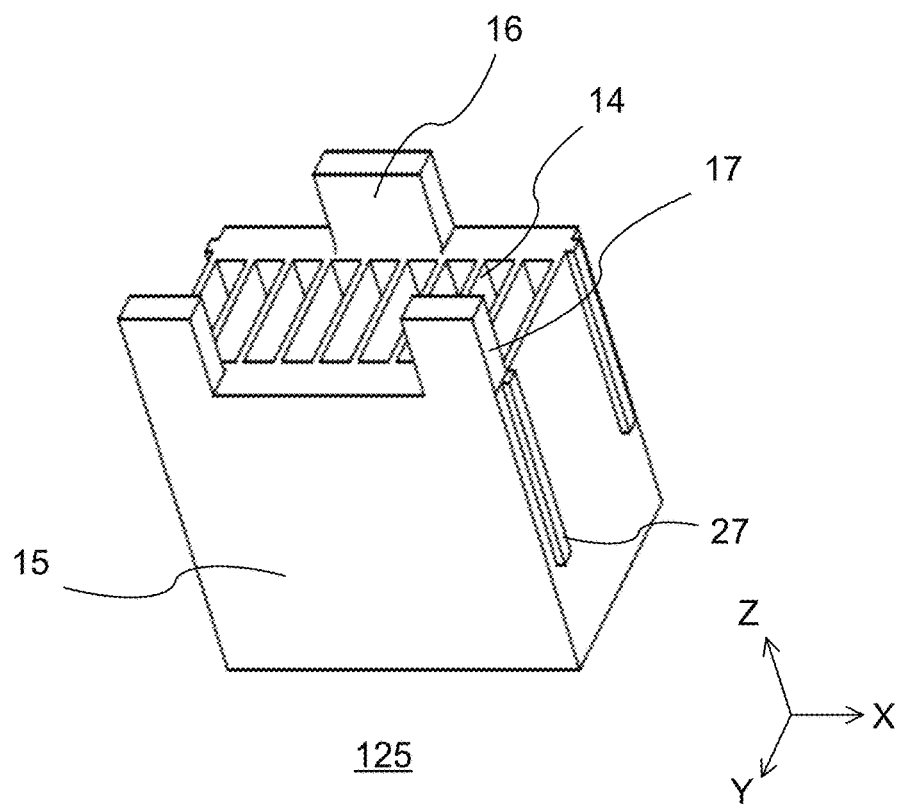
FIG. 17B is a perspective view of the first slit portion according to Embodiment 3, as viewed from a lens array side.

FIGS. 17A and 17B are external views of a first slit portion 125 of the image reading device 103 according to Embodiment 3 of the present disclosure. FIG. 17A is a perspective view of the first slit portion 125, as viewed from an image sensor 11 side. FIG. 17B is a perspective view of the first slit portion 125, as viewed from a lens array 7 side. As illustrated in FIGS. 17A and 17B, the first slit portion 125 according to Embodiment 3 has side plates 15. Four projections 27 are provided at end portions of the side plates 15 in the main scanning direction. The projections 27 are a base that is prepared by press working or injection molding and is for attaching the second light shielding plate 28. The projection 27 has a length in the optical-axis direction (Z-axis direction) shorter than the length of the first light shielding plate 14.

Figure 18:
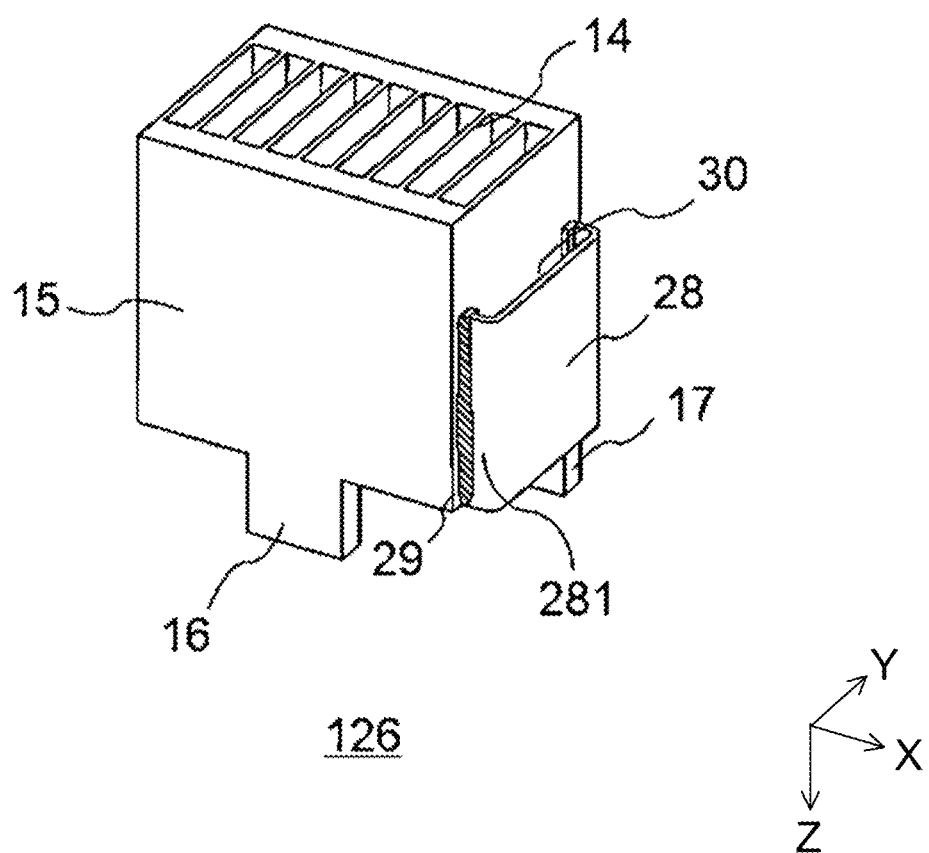
FIG. 18 is a perspective view of a second slit portion included in the image reading device according to Embodiment 3 of the present disclosure, as viewed from the image sensor side.

FIG. 18 is a perspective view of a second slit portion 126 of the image reading device 103 according to Embodiment 3 of the present disclosure, as viewed from the image sensor 11 side. As illustrated in FIG. 18, the second light shielding plate 28 includes side portions 281. The second slit portion 126 is a combination of the first slit portion 125 and the second light shielding plate 28 by fixing the side portions 281 to the projections 27 with an adhesive 29.

Figure 19:
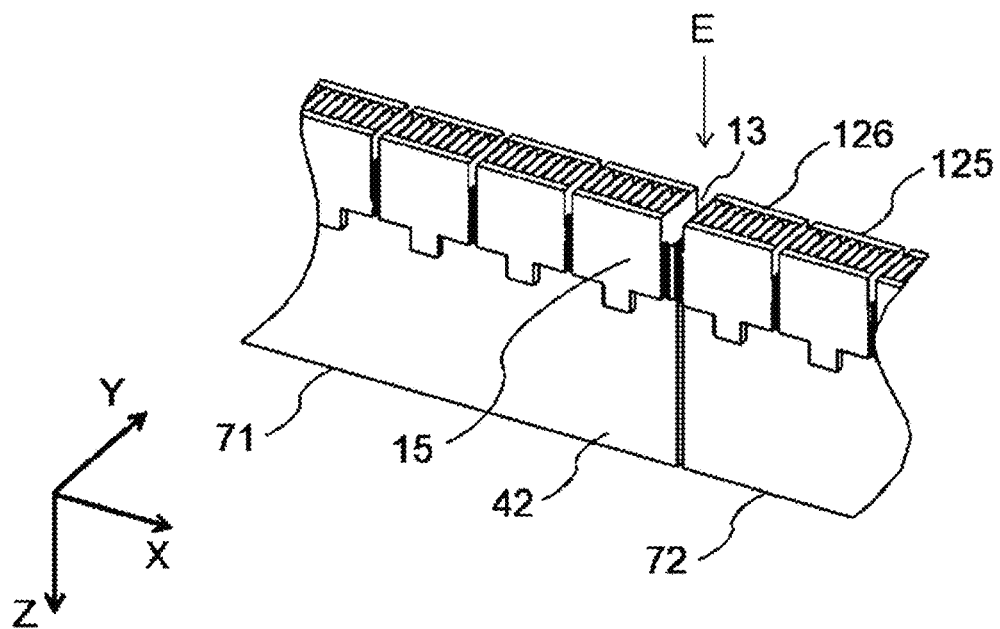
FIG. 19 is a perspective view of lens arrays, to which slit portions are bonded, included in the image reading device according to Embodiment 3 of the present disclosure.
Figure 20:
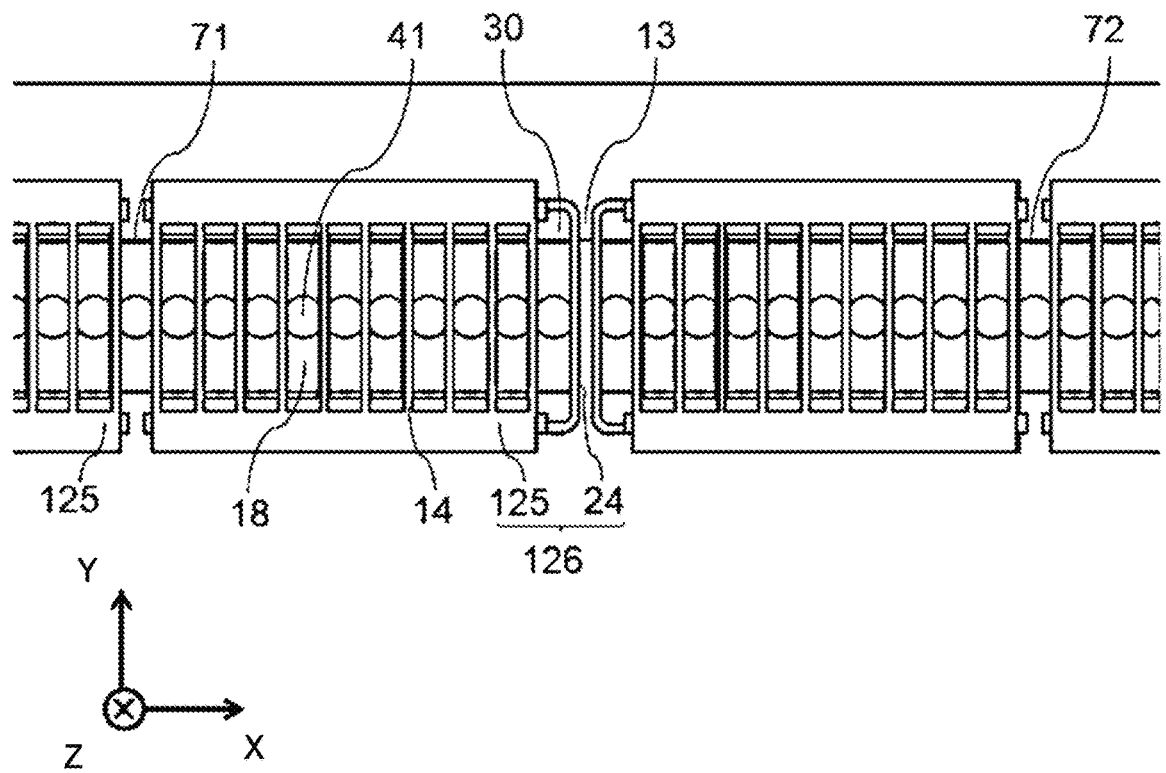
FIG. 20 is a bottom view of the lens arrays, to which the slit portions are bonded, as view from direction E illustrated in FIG. 19.

FIG. 19 is a perspective view of lens arrays 71 and 72 to which slit portions 125 and 126 of the image reading device 103 according to Embodiment 3 of the present disclosure are bonded. FIG. 20 is a bottom view of the lens arrays 71 and 72 to which slit portions 125 and 126 are bonded, as view from direction E illustrated in FIG. 19. The first slit portions 125 and the second slit portions 126 are bonded to the lens arrays 71 and 72 at the image sensor 11 side. The center line of an optical through path 30 defined by the first light shielding plate 14, the second light shielding plate 28, and the side plates 15 aligns with the optical axis of the lens body 41 closest to the gap 13.

As described above, by preliminary providing the projections 27 to the molded article of the first slit portion 125, and then adhering the second light shielding plate 28 thereto as needed, preparing of a die dedicated to the second slit portion 126 is unnecessary. This can reduce costs for dies and types of component.

In Embodiments 1 to 3, as one example, the slit portions 12 are arranged in the main scanning direction (X-axis direction) with a space therebetween for one optical path of the lens body 41, but the slit portions 12 may be arranged with no space therebetween.

In Embodiments 1 to 3, as one example, the lens array 7 and the slit portions 12 are arranged in a line in the main scanning direction (X-axis direction), but they may be arranged in multiple lines.

In Embodiments 1 to 3, as one example, the slit portion 12 has side plates 15, and the first light shielding plate 14 and the second light shielding plate 19 are held by the side plates 15 from both sides in the sub-scanning direction (Y-axis direction), but the side plate 15 may hold the light shielding plate only from one side in the sub-scanning direction (Y-axis direction). Furthermore, the slit portion 12 may lack the side plate 15 and the first light shielding plate 14 and the second light shielding plate 19 may be fixed to the holder 42 of the lens array 7.

In Embodiments 1 to 3, as one example, a plurality of slit portions 12 are arranged for one lens array 7, but one slit portion 12 may be provided for one lens array 7. A third slit portion of a case where one slit portion 12 is provided for one lens array 7 is provided with the second light shielding plates 19 at both ends.

In Embodiments 2 and 3, as one example, the side portions 241 or 281 of the second light shielding plate 24 or 28 are fixed to the recesses 23 or the projections 27 provided to the side plates 15 of the first slit portion 123 or 125, but any configuration capable of fixing the side portions of the second light shielding plate to the end portions of the side plates 15 of the first slit portions 123 and 125 is acceptable.

The configurations described in Embodiments 1 to 3 above merely show examples of the content of the present disclosure. The configurations of the embodiments may be combined with each other in any manner. The configurations may also be combined with other publicly-known techniques. Partial omission or change of the configurations can be made without departing from the scope of the present disclosure.

Hereinafter, various aspects of the present disclosure are described as appendices.

Appendix 1

An image reading device, comprising:
a plurality of lens arrays arranged in a main scanning direction and each including a plurality of lens bodies arranged in the main scanning direction, each two adjacent lens arrays of the plurality of lens arrays being arranged with a gap therebetween;

an image sensor to receive light converged by the plurality of lens bodies; and a plurality of slit portions arranged between the plurality of lens arrays and the image sensor in the main scanning direction, one or more slit portions of the plurality of slit portions being provided for one lens array of the plurality of lens arrays, the plurality of slit portions including a second slit portion that is a slit portion that includes first light shielding plates and a second light shielding plate, and including a first slit portion that is a slit portion that includes only the first light shielding plates in a case where more than one slit portions of the plurality of slit portions are provided for one lens array of the plurality of lens arrays, the first light shielding plates each separating an optical path of light passed through one lens body of the plurality of lens bodies from another optical path of light passed through an adjacent lens body of the plurality of lens bodies, the second light shielding plate restricting an optical path of light passed through a lens body of the plurality of lens bodies closest to the gap at a gap side in the main scanning direction and of which a position in a direction along the optical path at an image sensor side is closer to the plurality of lens arrays than the first light shielding plates are, so that a field of view of the lens body closest to the gap representing a spread of the restricted optical path overlaps, on a surface of the image sensor facing the plurality of lens arrays, a field of view of an adjacent lens body adjacent, with the gap therebetween, to the lens body closest to the gap of the plurality of lens bodies.

Appendix 2

An image reading device, comprising:
a plurality of lens arrays arranged in a main scanning direction and each including a plurality of lens bodies arranged in the main scanning direction, each two adjacent lens arrays of the plurality of lens arrays being arranged with a gap therebetween;

an image sensor to receive light converged by the plurality of lens bodies; and a plurality of slit portions arranged between the plurality of lens arrays and the image sensor in the main scanning direction by providing one or more slit portions of the plurality of slit portions for one of the plurality of lens arrays, wherein the plurality of slit portions include a second slit portion including first light shielding plates and a second light shielding plate, the first light shielding plates each separating an optical path of light passed through one lens body of the plurality of lens bodies from another optical path of light passed through an adjacent lens body of the plurality of lens bodies, the second light shielding plate restricting an optical path of light passed through a lens body of the plurality of lens bodies closest to the gap in a direction towards the gap and having an end portion facing the image sensor that is closer to the plurality of lens arrays than the first light shielding plates are.

Appendix 3

The image reading device according to appendix 2, wherein
the plurality of slit portions further include a first slit portion that is a slit portion including only the first light shielding plates in a case where more than one slit portions of the plurality of slit portions are provided for one lens array of the plurality of the lens arrays.

Appendix 4

The image reading device according to any one of appendices 1 to 3, wherein the plurality of slit portions include, in a case where one slit portion of the plurality of slit portions is provided for the one lens array, a third slit portion that is a slit portion including the second light shielding plates at both ends in the main scanning direction and the first light shielding plates between the both ends.

Appendix 5

The image reading device according to any one of appendices 1 to 4, wherein when light converged by the lens body of which the optical path is restricted by the second light shielding plate is emitted from the lens body, a viewing angle representing a maximum value of an angle that the optical path spreads relative to an optical axis of the lens body is θ2, a distance between an emission surface of the lens body and a surface of the image sensor facing the plurality of lens arrays is W, a diameter of the lens body is d, and a width of the gap is Δd, the viewing angle θ2, the distance W, the diameter d, and the width Δd satisfy a relationship of $W \cdot \tan(\theta 2) \geq d/2 + \Delta d/2$.

Appendix 6

The image reading device according to any one of appendices 1 to 5, wherein
a first overlap region has a length same as a length of a second overlap region in the main scanning direction, the first overlap region being a region in which fields of view of two lens bodies of the plurality of lens bodies restricted by the first light shielding plates blocking optical paths overlap each other on a surface of the image sensor facing the plurality of lens arrays, the second overlap region being a region in which fields of view of two lens bodies of the plurality of lens bodies restricted by the second light shielding plates blocking optical paths on the surface of the image sensor facing the plurality of lens arrays.

Appendix 7

The image reading device according to any one of appendices 1 to 6, wherein
the plurality of slit portions each include side plates extending in the main scanning direction between the plurality of lens arrays and the image sensor and provided at both sides of the first light shielding plates in the sub-scanning direction to hold the first light shielding plates.

Appendix 8

The image reading device according to appendix 7, wherein
the second slit portion has the side plates holding the first light shielding plates and the second light shielding plate.

Appendix 9

The image reading device according to appendix 7, wherein
the second slit portion has the side plates having end portions in the main scanning direction to which side portions of the second light shielding plate that protrude in the main scanning direction are bonded.

Appendix 10

The image reading device according to appendix 9, wherein
the side portions are bonded to a recess or a projection provided at the end portions of the side plates of the second slit portion in the main scanning direction.

Appendix 11

The image reading device according to any one of appendices 1 to 10, wherein
the plurality of slit portions provided for the one lens array are arranged with a space between adjacent slit portions of the plurality of slit portions, the space being for one optical path of the lens body.

Appendix 12

The image reading device according to any one of appendices 1 to 11, wherein
the first light shielding plates and the second light shielding plate of the slit portion each have an end at a lens array side being in contact with a surface of the lens array facing the image sensor.

Appendix 13

The image reading device according to any one of appendices 7 to 10, wherein
the slit portion includes one or more protrusions protruding from a part of an end surface of the side plate facing the plurality of lens arrays.

Appendix 14

The image reading device according to appendix 13, wherein
the one or more protrusions of the slit portion are bonded to the lens array by an adhesive to fix thereto.

Appendix 15

The image reading device according to appendix 13 or 14, wherein
the slit portion determines a position and an orientation of the slit portion by causing the one or more protrusions of the slit portion to come into contact with a surface of a lens retainer plate facing the image sensor, the lens retainer plate fixing the lens array.

Appendix 16

The image reading device according to any one of appendices 1 to 15, wherein an optical axis of the lens body is aligned with a straight line passing through a center of a light receiver of the image sensor and perpendicular to a light-receiving surface of the image sensor.

Appendix 17

The image reading device according to any one of appendices 7 to 10, wherein
an optical axis of the lens body is aligned with a center line of an optical through path surrounded by the first light shielding plates facing each other and the side plates.

Appendix 18

The image reading device according to any one of appendices 7 to 10, wherein
an optical axis of the lens body is aligned with a center line of an optical through path surrounded by the first light shielding plate, the second light shielding plate, and the side plates.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 101, 102, 103 Image reading device
1 Frame
2 Transparent plate
3 Frame side plate
5 Substrate support plate
6 Lens retainer plate
61 Contact surface
7, 71, 72 Lens array
41 Lens body
42 Holder
8 Sensor drive substrate
9 Sensor substrate
11 Image sensor
12 Slit portion
121, 123, 125 First slit portion
122, 124, 126 Second slit portion
13 Gap
14 First light shielding plate
15 Side plate
16, 17 Protrusion
18, 21, 26, 30 Optical through path
19, 24, 28 Second light shielding plate
20 Notch
23 Recess
25, 29 Adhesive
27 Projection
241, 281 Side portion

The invention claimed is:

1. An image reading device, comprising:
a plurality of lens arrays arranged in a main scanning direction and each including a plurality of lens bodies arranged in the main scanning direction, each two adjacent lens arrays of the plurality of lens arrays being arranged with a gap therebetween;
an image sensor to receive light converged by the plurality of lens bodies; and
a plurality of slit portions arranged between the plurality of lens arrays and the image sensor in the main scanning direction, one or more slit portions of the plurality of slit portions being provided for one lens array of the plurality of lens arrays, the plurality of slit portions including a second slit portion that is a slit portion that includes first light shielding plates and a second light shielding plate, and including a first slit portion that is a slit portion that includes only the first light shielding plates in a case where more than one slit portions of the plurality of slit portions are provided for one lens array of the plurality of lens arrays, the first light shielding plates each separating an optical path of light passed through one lens body of the plurality of lens bodies from another optical path of light passed through an adjacent lens body of the plurality of lens bodies, the second light shielding plate restricting an optical path of light passed through a lens body of the plurality of lens bodies closest to the gap at a gap side in the main scanning direction and of which a position in a direction along the optical path at an image sensor side is closer to the plurality of lens arrays than the first light shielding plates are, so that a field of view of the lens body closest to the gap representing a spread of the restricted optical path overlaps, on a surface of the image sensor facing the plurality of lens arrays, a field of view of an adjacent lens body adjacent, with the gap therebetween, to the lens body closest to the gap of the plurality of lens bodies.

2. The image reading device according to claim 1, wherein
the plurality of slit portions include, in a case where one slit portion of the plurality of slit portions is provided for the one lens array, a third slit portion that is a slit portion including the second light shielding plates at both ends in the main scanning direction and the first light shielding plates between the both ends.

3. The image reading device according to claim 1, wherein
when light converged by the lens body of which the optical path is restricted by the second light shielding plate is emitted from the lens body, a viewing angle representing a maximum value of an angle that the optical path spreads relative to an optical axis of the lens body is $\theta 2$, a distance between an emission surface of the lens body and the surface of the image sensor facing the plurality of lens arrays is W, a diameter of the lens body is d, and a width of the gap is $\Delta d$, the viewing angle $\theta 2$, the distance W, the diameter d, and the width $\Delta d$ satisfy a relationship of $W \cdot \tan(\theta 2) \geq d/2 + \Delta d/2$.

4. The image reading device according to claim 1, wherein
a first overlap region has a length same as a length of a second overlap region in the main scanning direction, the first overlap region being a region in which fields of view of two lens bodies of the plurality of lens bodies restricted by the first light shielding plates blocking optical paths overlap each other on the surface of the image sensor facing the plurality of lens arrays, the second overlap region being a region in which fields of view of two lens bodies of the plurality of lens bodies restricted by the second light shielding plates blocking optical paths on the surface of the image sensor facing the plurality of lens arrays.

5. The image reading device according to claim 1, wherein
the plurality of slit portions each include side plates extending in the main scanning direction between the plurality of lens arrays and the image sensor and provided at both sides of the first light shielding plates in the sub-scanning direction to hold the first light shielding plates.

6. The image reading device according to claim 5, wherein
the second slit portion has the side plates holding the first light shielding plates and the second light shielding plate.

7. The image reading device according to claim 5, wherein
the second slit portion has the side plates having end portions in the main scanning direction to which side portions of the second light shielding plate that protrude in the main scanning direction are bonded.

8. The image reading device according to claim 7, wherein
the side portions are bonded to a recess or a projection provided at the end portions of the side plates of the second slit portion in the main scanning direction.

9. The image reading device according to claim 5, wherein
the slit portion includes one or more protrusions protruding from a part of an end surface of the side plate facing the plurality of lens arrays.

10. The image reading device according to claim 9, wherein
the one or more protrusions of the slit portion are bonded to the lens array by an adhesive to fix thereto.

11. The image reading device according to claim 9, wherein
the slit portion determines a position and an orientation of the slit portion by causing the one or more protrusions of the slit portion to come into contact with a surface of a lens retainer plate facing the image sensor, the lens retainer plate fixing the lens array.

12. The image reading device according to claim 5, wherein
an optical axis of the lens body is aligned with a center line of an optical through path surrounded by the first light shielding plates facing each other and the side plates.

13. The image reading device according to claim 5, wherein
an optical axis of the lens body is aligned with a center line of an optical through path surrounded by the first light shielding plate, the second light shielding plate, and the side plates.

14. The image reading device according to claim 1, wherein
the plurality of slit portions provided for the one lens array are arranged with a space between adjacent slit portions of the plurality of slit portions, the space being for one optical path of the lens body.

15. The image reading device according to claim 1, wherein
the first light shielding plates and the second light shielding plate of the slit portion each have an end at a lens array side being in contact with a surface of the lens array facing the image sensor.

16. The image reading device according to claim 1, wherein
an optical axis of the lens body is aligned with a straight line passing through a center of a light receiver of the image sensor and perpendicular to a light-receiving surface of the image sensor.

17. An image reading device, comprising:
a plurality of lens arrays arranged in a main scanning direction and each including a plurality of lens bodies arranged in the main scanning direction, each two adjacent lens arrays of the plurality of lens arrays being arranged with a gap therebetween;
an image sensor to receive light converged by the plurality of lens bodies; and
a plurality of slit portions arranged between the plurality of lens arrays and the image sensor in the main scanning direction by providing one or more slit portions of the plurality of slit portions for one of the plurality of lens arrays, wherein
the plurality of slit portions include a second slit portion including first light shielding plates and a second light shielding plate, the first light shielding plates each separating an optical path of light passed through one lens body of the plurality of lens bodies from another optical path of light passed through an adjacent lens body of the plurality of lens bodies, the second light shielding plate restricting an optical path of light passed through a lens body of the plurality of lens bodies closest to the gap in a direction towards the gap and having an end portion facing the image sensor that is closer to the plurality of lens arrays than the first light shielding plates are.

18. The image reading device according to claim 17, wherein
the plurality of slit portions further include a first slit portion that is a slit portion including only the first light shielding plates in a case where more than one slit portions of the plurality of slit portions are provided for one lens array of the plurality of the lens arrays.

19. The image reading device according to claim 18, wherein
the plurality of slit portions include, in a case where one slit portion of the plurality of slit portions is provided for the one lens array, a third slit portion that is a slit portion including the second light shielding plates at both ends in the main scanning direction and the first light shielding plates between the both ends.

20. The image reading device according to claim 17, wherein
the plurality of slit portions include, in a case where one slit portion of the plurality of slit portions is provided for the one lens array, a third slit portion that is a slit portion including the second light shielding plates at both ends in the main scanning direction and the first light shielding plates between the both ends.

* * * * *